(12) United States Patent
Zheng et al.

(10) Patent No.: US 8,719,198 B2
(45) Date of Patent: May 6, 2014

(54) COLLABORATIVE LOCATION AND ACTIVITY RECOMMENDATIONS

(75) Inventors: Yu Zheng, Beijing (CN); Wencheng Zheng, Hong Kong (CN); Xing Xie, Beijing (CN)

(73) Assignee: Microsoft Corporation, Redmond, WA (US)

(\*) Notice: Subject to any disclaimer, the term of this patent is extended or adjusted under 35 U.S.C. 154(b) by 120 days.

(21) Appl. No.: 12/773,771

(22) Filed: May 4, 2010

(65) Prior Publication Data

US 2011/0276565 A1    Nov. 10, 2011

(51) Int. Cl.
*G06F 17/30* (2006.01)

(52) U.S. Cl.
USPC ............................................. 706/21; 706/46

(58) Field of Classification Search
USPC .................................................. 706/21, 46
See application file for complete search history.

(56) References Cited

U.S. PATENT DOCUMENTS

| | | | |
|---|---|---|---|
| 5,428,546 A | 6/1995 | Shah et al. | |
| 5,802,492 A | 9/1998 | DeLorme et al. | |
| 5,845,227 A | 12/1998 | Peterson | |
| 5,904,727 A | 5/1999 | Prabhakaran | |
| 6,023,241 A | 2/2000 | Clapper | |
| 6,091,359 A | 7/2000 | Geier | |
| 6,091,956 A | 7/2000 | Hollenberg | |
| 6,128,279 A | 10/2000 | O'Neil et al. | |
| 6,243,647 B1 | 6/2001 | Berstis et al. | |
| 6,351,775 B1 | 2/2002 | Yu | |
| 6,385,539 B1 | 5/2002 | Wilson et al. | |
| 6,446,121 B1 | 9/2002 | Shah et al. | |
| 6,496,814 B1 | 12/2002 | Busche | |
| 6,513,026 B1 * | 1/2003 | Horvitz et al. | 706/46 |
| 6,553,310 B1 | 4/2003 | Lopke | |
| 6,584,401 B2 | 6/2003 | Kirshenbaum et al. | |
| 6,606,643 B1 | 8/2003 | Emens et al. | |
| 6,611,881 B1 | 8/2003 | Gottfurcht et al. | |
| 6,625,319 B1 | 9/2003 | Krishnamachari | |

(Continued)

FOREIGN PATENT DOCUMENTS

| | | |
|---|---|---|
| EP | 1087605 A2 | 3/2001 |
| GB | 2421653 A | 6/2006 |

(Continued)

OTHER PUBLICATIONS

Office Action for U.S. Appl. No. 12/037,347, mailed on Aug. 17, 2011, Yu Zheng, "System for Logging Life Experiences Using Geographic Cues", 9 pgs.

(Continued)

*Primary Examiner* — Kim Nguyen

(74) *Attorney, Agent, or Firm* — Carole Boelitz; Micky Minhas; Lee & Hayes

(57) ABSTRACT

Techniques describe constructing a location and activity recommendation model to identify relationships between locations and activities. To construct the model, the process obtains global positioning system (GPS) logs of geographical locations collected over time and identifies stay points representing locations visited by an individual user. The process also identifies points of interest in a region using a database and correlates a relationship between activity to activity by submitting queries to a search engine. The information gathered is used to fill locations and activities in a location-activity matrix. Recommendations may be made for a location and/or activity when given a user query, based on a user's present geographical location, or a prediction of a user's interest.

19 Claims, 12 Drawing Sheets

(56) References Cited

U.S. PATENT DOCUMENTS

| | | |
|---|---|---|
| 6,724,733 B1 | 4/2004 | Schuba et al. |
| 6,732,120 B1 | 5/2004 | Du |
| 6,785,704 B1 | 8/2004 | McCanne |
| 6,816,779 B2 | 11/2004 | Chen et al. |
| RE38,724 E | 4/2005 | Peterson |
| 6,904,160 B2 | 6/2005 | Burgess |
| 6,970,884 B2 | 11/2005 | Aggarwal |
| 6,981,055 B1 | 12/2005 | Ahuja et al. |
| 7,003,555 B1 | 2/2006 | Jungck |
| 7,013,517 B2 | 3/2006 | Kropf |
| 7,031,517 B1 | 4/2006 | Le et al. |
| 7,062,562 B1 | 6/2006 | Baker et al. |
| 7,111,061 B2 | 9/2006 | Leighton et al. |
| 7,136,932 B1 | 11/2006 | Schneider |
| 7,152,118 B2 | 12/2006 | Anderson, IV et al. |
| 7,155,456 B2 | 12/2006 | Abbott, III et al. |
| 7,171,415 B2 | 1/2007 | Kan et al. |
| 7,194,552 B1 | 3/2007 | Schneider |
| 7,228,359 B1 | 6/2007 | Monteiro |
| 7,233,861 B2 | 6/2007 | Van Buer et al. |
| 7,284,051 B1 | 10/2007 | Okano et al. |
| 7,349,768 B2 | 3/2008 | Bruce et al. |
| 7,366,726 B2 | 4/2008 | Bellamy et al. |
| 7,395,250 B1 | 7/2008 | Aggarwal et al. |
| 7,437,239 B2 | 10/2008 | Serre |
| 7,447,588 B1 | 11/2008 | Xu et al. |
| 7,479,897 B2 | 1/2009 | Gertsch et al. |
| 7,493,294 B2 * | 2/2009 | Flinn et al. .................. 706/12 |
| 7,519,690 B1 | 4/2009 | Barrow et al. |
| 7,548,936 B2 | 6/2009 | Liu et al. |
| 7,561,959 B2 | 7/2009 | Hopkins et al. |
| 7,574,508 B1 | 8/2009 | Kommula |
| 7,584,159 B1 | 9/2009 | Chakrabarti et al. |
| 7,584,301 B1 | 9/2009 | Joshi |
| 7,603,233 B2 | 10/2009 | Tashiro |
| 7,610,151 B2 | 10/2009 | Letchner et al. |
| 7,660,441 B2 | 2/2010 | Chen et al. |
| 7,685,422 B2 | 3/2010 | Isozaki et al. |
| 7,706,964 B2 | 4/2010 | Horvitz et al. |
| 7,707,314 B2 | 4/2010 | McCarthy et al. |
| 7,710,984 B2 | 5/2010 | Dunk |
| 7,739,040 B2 | 6/2010 | Horvitz |
| 7,840,407 B2 | 11/2010 | Strope et al. |
| 7,904,530 B2 * | 3/2011 | Partridge et al. ............... 709/217 |
| 7,930,427 B2 | 4/2011 | Josefsberg et al. |
| 7,948,400 B2 | 5/2011 | Horvitz et al. |
| 7,982,635 B2 | 7/2011 | Seong |
| 7,984,006 B2 * | 7/2011 | Price .............................. 706/46 |
| 7,991,879 B2 | 8/2011 | Josefsberg et al. |
| 8,060,462 B2 * | 11/2011 | Flinn et al. .................... 707/603 |
| 8,117,138 B2 | 2/2012 | Apte et al. |
| 8,135,505 B2 | 3/2012 | Vengroff et al. |
| 8,190,649 B2 | 5/2012 | Bailly |
| 8,275,649 B2 | 9/2012 | Zheng et al. |
| 8,562,439 B2 | 10/2013 | Shuman et al. |
| 8,577,380 B2 | 11/2013 | Frias Martinez et al. |
| 2002/0032689 A1 | 3/2002 | Abbott, III et al. |
| 2002/0038360 A1 | 3/2002 | Andrews et al. |
| 2002/0044690 A1 | 4/2002 | Burgess |
| 2002/0052873 A1 | 5/2002 | Delgado et al. |
| 2002/0077749 A1 | 6/2002 | Doi |
| 2002/0128768 A1 | 9/2002 | Nakano et al. |
| 2003/0053424 A1 | 3/2003 | Krishnamurthy et al. |
| 2003/0063133 A1 | 4/2003 | Foote et al. |
| 2003/0069893 A1 | 4/2003 | Kanai et al. |
| 2003/0069968 A1 | 4/2003 | O'Neil et al. |
| 2003/0139898 A1 | 7/2003 | Miller et al. |
| 2003/0140040 A1 | 7/2003 | Schiller |
| 2003/0195810 A1 | 10/2003 | Raghupathy et al. |
| 2003/0229697 A1 | 12/2003 | Borella |
| 2004/0039798 A1 | 2/2004 | Hotz et al. |
| 2004/0064338 A1 | 4/2004 | Shiota et al. |
| 2004/0073640 A1 | 4/2004 | Martin et al. |
| 2004/0196161 A1 | 10/2004 | Bell et al. |
| 2004/0198386 A1 | 10/2004 | Dupray |
| 2004/0217884 A1 | 11/2004 | Samadani et al. |
| 2004/0264465 A1 | 12/2004 | Dunk |
| 2005/0004830 A1 | 1/2005 | Rozell et al. |
| 2005/0004903 A1 | 1/2005 | Tsuda |
| 2005/0031296 A1 | 2/2005 | Grosvenor |
| 2005/0075116 A1 | 4/2005 | Laird et al. |
| 2005/0075119 A1 | 4/2005 | Sheha et al. |
| 2005/0075782 A1 | 4/2005 | Torgunrud |
| 2005/0108261 A1 | 5/2005 | Glassy et al. |
| 2005/0131889 A1 | 6/2005 | Bennett et al. |
| 2005/0198286 A1 | 9/2005 | Xu et al. |
| 2005/0225678 A1 | 10/2005 | Zisserman et al. |
| 2005/0265317 A1 | 12/2005 | Reeves et al. |
| 2005/0278371 A1 | 12/2005 | Funk et al. |
| 2006/0020597 A1 | 1/2006 | Keating et al. |
| 2006/0036630 A1 | 2/2006 | Gray |
| 2006/0042483 A1 | 3/2006 | Work et al. |
| 2006/0075139 A1 | 4/2006 | Jungck |
| 2006/0085177 A1 | 4/2006 | Toyama et al. |
| 2006/0085419 A1 | 4/2006 | Rosen |
| 2006/0090122 A1 | 4/2006 | Pyhalammi et al. |
| 2006/0095540 A1 | 5/2006 | Anderson et al. |
| 2006/0101377 A1 | 5/2006 | Toyama et al. |
| 2006/0129675 A1 | 6/2006 | Zimmer et al. |
| 2006/0143442 A1 | 6/2006 | Smith |
| 2006/0156209 A1 | 7/2006 | Matsuura et al. |
| 2006/0161560 A1 | 7/2006 | Khandelwal et al. |
| 2006/0173838 A1 | 8/2006 | Garg et al. |
| 2006/0190602 A1 | 8/2006 | Canali et al. |
| 2006/0200539 A1 | 9/2006 | Kappler et al. |
| 2006/0212217 A1 | 9/2006 | Sheha et al. |
| 2006/0224303 A1 | 10/2006 | Hayashi |
| 2006/0224773 A1 | 10/2006 | Degenaro et al. |
| 2006/0247844 A1 | 11/2006 | Wang et al. |
| 2006/0251292 A1 | 11/2006 | Gokturk et al. |
| 2006/0266830 A1 | 11/2006 | Horozov et al. |
| 2007/0005419 A1 | 1/2007 | Horvitz et al. |
| 2007/0016663 A1 | 1/2007 | Weis |
| 2007/0041393 A1 | 2/2007 | Westhead et al. |
| 2007/0064633 A1 | 3/2007 | Fricke |
| 2007/0064715 A1 | 3/2007 | Lloyd et al. |
| 2007/0088974 A1 | 4/2007 | Chandwani et al. |
| 2007/0100776 A1 | 5/2007 | Shah et al. |
| 2007/0118668 A1 | 5/2007 | McCarthy et al. |
| 2007/0127833 A1 | 6/2007 | Singh |
| 2007/0168208 A1 | 7/2007 | Aikas et al. |
| 2007/0226004 A1 | 9/2007 | Harrison |
| 2008/0016051 A1 | 1/2008 | Schiller |
| 2008/0016233 A1 | 1/2008 | Schneider |
| 2008/0059576 A1 | 3/2008 | Liu et al. |
| 2008/0071465 A1 | 3/2008 | Chapman et al. |
| 2008/0076451 A1 | 3/2008 | Sheha et al. |
| 2008/0086574 A1 | 4/2008 | Raciborski et al. |
| 2008/0098313 A1 | 4/2008 | Pollack |
| 2008/0201074 A1 | 8/2008 | Bleckman et al. |
| 2008/0201102 A1 | 8/2008 | Boettcher et al. |
| 2008/0214157 A1 | 9/2008 | Ramer et al. |
| 2008/0215237 A1 | 9/2008 | Perry |
| 2008/0235383 A1 | 9/2008 | Schneider |
| 2008/0268876 A1 | 10/2008 | Gelfand et al. |
| 2008/0270019 A1 | 10/2008 | Anderson et al. |
| 2008/0312822 A1 | 12/2008 | Lucas et al. |
| 2008/0319660 A1 | 12/2008 | Horvitz et al. |
| 2008/0319974 A1 | 12/2008 | Ma et al. |
| 2009/0005987 A1 | 1/2009 | Vengroff et al. |
| 2009/0019181 A1 | 1/2009 | Fang et al. |
| 2009/0063646 A1 | 3/2009 | Mitnick |
| 2009/0083128 A1 | 3/2009 | Siegel |
| 2009/0083237 A1 | 3/2009 | Gelfand et al. |
| 2009/0100018 A1 | 4/2009 | Roberts |
| 2009/0138188 A1 | 5/2009 | Kores et al. |
| 2009/0164516 A1 | 6/2009 | Svendsen et al. |
| 2009/0213844 A1 * | 8/2009 | Hughston .................... 370/352 |
| 2009/0216435 A1 | 8/2009 | Zheng et al. |
| 2009/0216704 A1 | 8/2009 | Zheng et al. |
| 2009/0222581 A1 | 9/2009 | Josefsberg et al. |
| 2009/0228198 A1 | 9/2009 | Goldberg et al. |
| 2009/0239552 A1 | 9/2009 | Churchill et al. |
| 2009/0282122 A1 | 11/2009 | Patel et al. |

(56) References Cited

U.S. PATENT DOCUMENTS

| | | |
|---|---|---|
| 2009/0326802 A1 | 12/2009 | Johnson |
| 2010/0004997 A1 | 1/2010 | Mehta et al. |
| 2010/0010991 A1 | 1/2010 | Joshi |
| 2010/0027527 A1 | 2/2010 | Higgins et al. |
| 2010/0070171 A1 | 3/2010 | Barbeau et al. |
| 2010/0076968 A1 | 3/2010 | Boyns et al. |
| 2010/0082611 A1 | 4/2010 | Athsani et al. |
| 2010/0111372 A1 | 5/2010 | Zheng et al. |
| 2010/0153292 A1 | 6/2010 | Zheng et al. |
| 2010/0279616 A1 | 11/2010 | Jin et al. |
| 2010/0312461 A1 | 12/2010 | Haynie et al. |
| 2011/0022299 A1 | 1/2011 | Feng et al. |
| 2011/0029224 A1 | 2/2011 | Chapman et al. |
| 2011/0130947 A1 | 6/2011 | Basir |
| 2011/0173015 A1 | 7/2011 | Chapman et al. |
| 2011/0184949 A1 | 7/2011 | Luo |
| 2011/0191011 A1 | 8/2011 | McBride et al. |
| 2011/0208419 A1 | 8/2011 | Boss et al. |
| 2011/0280453 A1 | 11/2011 | Chen et al. |
| 2011/0282798 A1 | 11/2011 | Zheng et al. |
| 2011/0302209 A1* | 12/2011 | Flinn et al. ............... 707/780 |
| 2012/0030029 A1* | 2/2012 | Flinn et al. ............. 705/14.66 |
| 2012/0030064 A1* | 2/2012 | Flinn et al. ............... 705/26.7 |
| 2012/0150425 A1 | 6/2012 | Chapman et al. |

FOREIGN PATENT DOCUMENTS

| | | |
|---|---|---|
| JP | 2002140362 | 5/2002 |
| WO | WO2006097907 A2 | 9/2006 |
| WO | WO2009053411 A1 | 4/2009 |
| WO | WO2010062726 A2 | 6/2010 |

OTHER PUBLICATIONS

Ahern, et al., "World Explorer: Visualizing Aggregate Data From Unstructured Text in Geo-Referenced Collections", In the Proceedings of the 7th ACM/IEEE-CS Joint Conference on Digital Libraries, 2007, pp. 1-10.

Graham, "GPS Gadgets Can Reveal More Than Your Location", Retrieved on Nov. 28, 2011 at <<http://www.google.com/#sclient=psy-ab&hl=en&source=hp&q=Graham%2C+GPS+Gadgets+Can+Reveal+More+Than+Your+Location&pbx=1&oq=Graham%2C+GPS+Gadgets+Can+Reveal+More+Than+Your+Location%22%2C+&aq=f&aql=&aq1=&gs_sm=d&gs_upl=2870I6708I0I10140I2I2I0I0I0I0I266I438I0.1.1I210&bav=on.2,or.r_gc.r_pw.,cf.osb&fp=533a712cc6ce8ba0&biw=1280&bih=808>>, 2008, pp. 1-2.

Hariharan, et al., "Project Lachesis: Parsing and Modeling Location Histories", ACM, In the Proceedings of GIScience, 2004, pp. 106-124.

Office Action for U.S. Appl. No. 12/562,588, mailed on Dec. 8, 2011, Yu Zheng, "Mining Life Pattern Based on Location History", 31 pgs.

Schofield, "It's GeoLife, Jim, But Not as we Know it", Guardian News, Retrieved on Nov. 28, 2011 at <<http://www.guardian.co.uk/technology/2008/mar/13/microsoft.research/print>>, Mar. 12, 2008, 2 pgs.

Ye, et al., "Mining Individual Life Pattern Based on Location History," Tenth International Conference on Mobile Data Management: Systems, Services and Middleware, May 18-20, 2009, Taipei, 10 pages.

Zheng, et al., "Searching Your Life on Web Maps", Microsoft Research, Available at <<http://research.microsoft.com/en-us/people/yuzheng/searching_your_life_over_web_maps.pdf>>, 2008, 4 pgs.

Adomavicius, Tuzhilin, "Toward the Next Generation of Recommender Systems: A Survey of the State-of-the-Art and Possible Extensions", retrieved on Dec. 29, 2009 at <<http://www.inf.unibz.it/~ricci/ATIS/papers/state-of-the-art-2005.pdf>>, IEEE Transactions on Knowledge and Data Engineering, vol. 17, No. 6, Jun. 2005, pp. 734-749.

Agrawal, et al., "Mining Association Rules between Sets of Items in Large Databases", retrieved on Aug. 4, 2009 at <<http://rakesh.agrawal-family.com/papers/sigmod93assoc.pdf>>, ACM, Proceedings of SIGMOD 1993, Jun. 1993, pp. 207-216.

Agrawal, et al., "Mining Sequential Patterns", retrieved on Aug. 4, 2009 at <<http://www.almaden.ibm.com/cs/projects/iis/hdb/Publications/papers/icde95.ps.gz>>, Proceedings of ICDE 1995, Mar. 1995, 12 pgs.

Aizawa, et al., "Capture and Efficient Retrieval of Life Log", available at least as early as Nov. 16, 2007, at <<http://www.ii.ist.i.kyoto-u.ac.jp/~sumi/pervasive04/program/Aizawa.pdf>>, In Pervasive 2004 Workshop on Memory and Sharing of Experiences, Apr. 2004, 6 pgs.

Aizawa, "Digitizing Personal Experiences: Capture and Retrieval of Life Log", at <<http://ieeexplore.ieee.org/iel5/9520/30168/01385968.pdf?arnumber=1385968 >>, Proceedings of the 11th International Multimedia Modelling Conference (MMM'05), Jan. 2005, pp. 1 (abstract).

Allen, "Dredging-up the Past: Lifelogging, Memory and Surveillance", retrieved at <<http://lsr.nellco.org/cgi/viewcontent.cgi?article=1177&context=upenn/wps>>, University of Pennsylvania Law School, 2007, pp. 50.

Amato, et al., "Region Based Image Similarity Search Inspired by Text Search", Third Italian Research Conference on Digital Library Systems, Padova, Italy, Jan. 29-30, 2007, pp. 78-85.

Belussi, et al, "Estimating the Selectivity of Spatial Queries Using the 'Correlation' Fractal Dimension", retrieved on Apr. 15, 2010 at <<http://www.vldb.org/conf/1995/P299.PDF>>, Proceedings of Conference on Very Large Data Bases (VLDB), Sep. 1995, pp. 299-310.

bing.com, Maps, Retrieved on Dec. 28, 2009 at <<http://cn.bing.com/ditu/>>, 2 pgs.

Bohm, "A Cost Model for Query Processing in High Dimensional Data Spaces", retrieved on Apr. 15, 2010 at <<http://www.dbs.informatik.uni-muenchen.de/~boehm/publications/tods-modeling.final.pdf>>, ACM Transactions on Database Systems, Jun. 2000, pp. 1-43.

Brakatsoulas, et al., "On Map-Matching Vehicle Tracking Data", VLDB Endowment, In the Proceedings of the 31st International Conference on Very Large Data Bases, Sep. 2005, pp. 853-864.

Brunato, Battiti, "A Location-Dependent Recommender System for the Web", retrieved on Dec. 29, 2009 at <<http://dit.unitn.it/~brunato/pubblicazioni/MobEA.pdf>>, MobEA Workshop, Budapest, May 2003, pp. 1-5.

Cai, "Indexing Spatio-Temporal Trajectories with Chebyshev Polynomials", retrieved on Apr. 15, 2010 at <<http://www.cs.ubc.ca/~rng/psdepository/sigmod2004.pdf>>, ACM, Conference on Management of Data, Jun. 13-18, 2004, pp. 599-610.

Cao, et al., "Mining Frequent Spatio-temporal Sequential Patterns", retrieved on Aug. 4, 2009 at <<http://i.cs.hku.hk/~nikos/icdm05.pdf>>, IEEE Computer Society, ICDM 2005, Nov. 2005, pp. 82-89.

Chan, et al, "Efficient Time Series Matching by Wavelets", retrieved on Apr. 15, 2010 at <<http://infolab.usc.edu/csci599/Fall2003/Time%20Series/Efficient%20Time%20Series%20Matching%20by%20Wavelets.pdf>>, IEEE Computer Society, Proceedings of Conference on Data Engineering (ICDE), Mar. 1999, pp. 126-133.

Chawathe, "Segment-Based Map Matching", In the Proceedings of the IEEE Intelligent Vehicles Symposium, Jun. 13-15, 2007, pp. 1190-1197.

Chen, et al, "On the Marriage of Lp-norms and Edit Distance", retrieved on Apr. 15, 2010 at <<http://www.google.co.in/url?sa=t&source=web&ct=res&cd=3&ved=0CBEQFjAC&url=http%3A%2F%2Fciteseerx.ist.psu.edu%2Fviewdoc%2Fdownload%3Fdoi%3D10.1.1.1.7443%26rep%3Drep1%26type%3Dpdf&rct=j&q=On+the+marriage+of+lp-norms+and+edit+distance&ei=_ezGS62IE439_Aa1qIzZDA&usg=AFQjCNHFZScVkE4uy1b_oC-Pr4ur7KIBdQ>>, Proceedings of Conference on Very Large Data Bases (VLDB), Aug. 29-Sep. 3, 2004, pp. 792-803.

Chen, et al, "Robust and Fast Similarity Search for Moving Object Trajectories", retrieved on Apr. 15, 2010 at <<http://citeseerx.ist.psu.edu/viewdoc/download;jsessionid=2C0EAC347F5F144727996F29CEFD49FB?doi=10.1.1.94.8191&rep=rep1&type=pdf>>, ACM, Conference on Management of Data, Jun. 2005, pp. 491-502.

(56) References Cited

OTHER PUBLICATIONS

Datta, et al., "Image Retrieval: Ideas, Influences, and Trends of the New Age", ACM Computing Surveys, vol. 40, No. 2, Article 5, Apr. 2008, pp. 1-60.
Deerwester, et al., "Indexing by Latent Semantic Analysis", J. Amer. Soc. Info. Sci., vol. 41, No. 6, Jan. 1990, 34 pages.
Ding et al, "Querying and Mining of Time Series Data: Experimental Comparison of Representations and Distance Measures", retrieved on Apr. 15, 2010 at <<http://www.vldb.org/pvldb/1/1454226.pdf>>, VLDB Endowment, PVLDB'08, Aug. 23-28, 2008, pp. 1542-1552.
Dubuisson et al., "A Modified Hausdorff Distance for Object Matching", Proceedings of the 12th IAPR International Conference on Pattern Recognition, Computer Vision & Image Processing, vol. 1, Oct. 9-13, 1994, pp. 566-568.
Eagle et al, "Reality mining: sensing complex social systems", Springer-Verlag London, Personal and Ubiquitous Computing, vol. 10, Issue 4, Mar. 2006, pp. 255-268.
Estivill-Castro et al, "Data Mining Techniques for Autonomous Exploration of Large Volumes of Geo-referenced Crime Data", 6th International Conference on GeoCom.putation, University of Queensland, Brisbane, Australia, Sep. 24-26, 2001, 12 pages.
Faloutsos et al., "Fast Subsequences Matching in Time-Series Databases," Proceedings of the 1994 ACM SIGMOD International Conference on Management of Data , vol. 23, No. 2, Jun. 1994, 11 pgs.
Frentzos et al, "Algorithms for Nearest Neighbor Search on Moving Object Trajectories", retrieved on Apr. 15, 2010 at <<http://infolab.cs.unipi.gr/pubs/journals/FGPT06-Geoinformatica.pdf>>, Kluwer Academic Publishers, Geoinformatica, vol. 11, No. 2, Jun. 2007, pp. 1-32.
Frentzos et al, "Index-based Most Similar Trajectory Search", retrieved on Apr. 15, 2010 at <<http://isl.cs.unipi.gr/pubs/TR/UNIPI-ISL-TR-2006-01.pdf>>, IEEE Conference on Data Engineering (Technical Report UNIPI-ISL-TR-2006-01), Jun. 2006, pp. 1-12.
Giannotti, et al., Efficient Mining of Temporally Annotated Sequences, retrieved on Aug. 4, 2009 at <<http://www.siam.org/meetings/sdm06/proceedings/032giannottif.pdf>>, Proceedings of the Sixth SIAM Intl Conference on Data Mining, Apr. 2006, pp. 346-357.
Giannotti, et al., "Trajectory Pattern Mining", retrieved on Aug. 4, 2009 at <<http://cs.gmu.edu/~jessica/temp/p330-giannotti.pdf>>, ACM, KDD'07, Aug. 2007, pp. 330-339.
Goldberg, et al., "Computing the Shortest Path: A Search Meets Graph Theory", SODA'05 Proceedings of the Sixteenth Annual ACM-SIAM Symposium on Discrete Algorithms, Jan. 2005, pp. 156-165, 10 pgs.
Gonzalez, et al., "Adaptive Fastest Path Computation on a Road Network: A Traffic Mining Approach", ACM, In the Proceedings of the 33rd International Conference on Very Large Data Bases, Sep. 23-28, 2007, pp. 794-805.
Gonzalez, Hidalgo, Barabasi, "Understanding individual human mobility patterns Supplementary Material", retrieved on Dec. 29, 2009 at <<http://www.barabasilab.com/pubs/CCNR-ALB__Publications/200806-05__Nature-MobilityPatterns/200806-05__Nature-MobilityPatterns-SuppMat13.pdf>>, Nature, vol. 453, 2008, pp. 779-782.
"GPS-Waypoints", retrieved on Apr. 15, 2010 at <<http://www.gps-waypoints.net/>>, 2010, pp. 1.
Greenfield, "Matching GPS Observations to Locations on a Digital Map", In the Proceedings of the 81st Annual Meeting of the Transportation Research Board, Washington, DC, Jan. 2002, 13 pgs.
Gustavsen, "Condor—an application framework for mobility-based context-aware applications", retrieved on Aug. 4, 2009 at <<http://www.comp.lancs.ac.uk/~dixa/conf/ubicomp2002-models/pdf/Gustavsen-goteborg%20sept-02.pdf>>, UBICOMP 2002, 2002, pp. 1-6.
Gutman, "Reach-Based Routing: A New Approach to Shortest Path Algorithms Optimized for Road Networks", In the Proceedings of the Sixth Workshop on Algorithm Engineering and Experiments and the First Workshop on Analytic Algorithmics and Combinatorics, New Orleans, LA, USA, Jan. 10, 2004, 12 pgs.
Guttman, "R-Trees: A Dynamic Index Structure for Spatial Searching", retrieved on Apr. 15, 2010 at <<http://www.google.co.in/url?sa=t&source=web&ct=res&cd=1&ved=0CAcQFjAA&url=http%3A%2F%2Fciteseerx.ist.psu.edu%2Fviewdoc%2Fdownload%3Fdoi%3D10.1.1.66.1675%26rep%3Drep1%26type%3Dpdf&rct=j&q=R-trees%A+a+dynamic+index+structure+for+spatial+searching&ei=JfTGS6uRPJH0__AaCpICHDQ&usg=AFQjCNFtQttNVHCKYJQZcH052-KmCxIZ0g>>, ACM, Proceedings of Conference on Management of Data, 1984, pp. 47-57.
Han, et al., "Frequent pattern mining: current status and future directions", retrieved on Aug. 4, 2009 at <<http://www.springerlink.com/content/9p5633hm18x55867/fulltext.pdf>>, Springer Science+Business Media, LLC, 2007, pp. 55-86.
Hart, et al., "A Formal Basis for the Heuristic Determination of Minimum Cost Paths", In the Proceedings of IEEE Transactions of Systems Science and Cybernetics, vol. 4, No. 2, Feb. 12, 2007 (First Publication 1968), pp. 100-107.
Hjaltason, Samet, "Distance Browsing in Spatial Databases", retrieved on Apr. 15, 2010 at <<http://citeseerx.ist.psu.edu/viewdoc/download?doi=10.1.1.25.4224&rep=rep1&type=pdf>>, ACM Transactions on Database Systems, vol. 24, No. 2, Jun. 1999, pp. 265-318.
Huang, Shekhar, Xiong, "Discovering Co-location Patterns from Spatial Datasets: A General Approach", retrieved on Dec. 29, 2009 at <<http://www.spatial.cs.umn.edu/paper_ps/coloc-tkde.pdf>>, IEEE Transactions on Knowledge and Data Engineering, vol. 16, Issue 12, Dec. 2004, pp. 1472-1485.
Huang, et al., "Project Report (draft version) Spatial Outlier Detection", retrieved on Dec. 12, 2008 at <<http://www-users.cs.umn.edu/~joh/csci8715/P6.pdf>>, Computer Science Department, University of Minnesota, 2004, pp. 1-8.
Jan, Horowitz, Peng, "Using GPS Data to Understand Variations in Path Choice", retrieved on Apr. 15, 2010 at <<https://pantherfile.uwm.edu/horowitz/www/pathchoice.pdf>>, National Research Council, Transportation Research Record 1725, 2000, pp. 37-44.
Jing, et al., "Hierarchical Optimization of Optimal Path Finding for Transportation Applications", (University of Michigan Research Paper, 1996, pp. 269-276) in the Proceedings of the Fifth International Conference on Informaton and Knowledge Management, 1996, pp. 261-268.
Kanoulas, Du, Xia, Zhang, "Finding Fastest Paths on a Road Network with Speed Patterns", retrieved on Dec. 24, 2009 at <<http://www.inf.unibz.it/dis/teaching/SDB/paper/kanoulasDXZ__icde06__fastestpath.pdf>>, IEEE Computer Society, Proceedings of Conference on Data Engineering (ICDE), 2006, pp. 1-10.
Kavouras, et al., "A Method for the Formalization and Integration of Geographic Categorizations", Draft version from the International Journal of Geographic Information Science, vol. 16, No. 5, 2002, pp. 439-453.
Ke, et al., "Correlated Pattern Mining in Quantitative Databases", ACM Transactions on Database Systems, vol. V, No. N, Apr. 2008, 44 pages.
Ke, et al., "Efficient Correlations Search from Graph Databases", IEEE Transactions on Knowledge and Data Engineering, vol. 20, Issue 12, Dec. 2008, pp. 1601-1615.
Kharrat, Popa, Zeitouni, Faiz, "Clustering Algorithm for Network Constraint Trajectories", retrieved on Apr. 15, 2010 at <<http://www.prism.uvsq.fr/~karima/papers/SDH__08.pdf>>, Springer Berlin, Symposium on Spatial Data Handling (SDH), 2008, pp. 631-647.
Korn, Pagel, Faloutsos, "On the 'Dimensionality Curse' and the 'Self-Similarity Blessing'", retrieved on Apr. 15, 2010 at <<http://www.informedia.cs.cmu.edu/documents/korn__dimcurse__2001.pdf>>, IEEE Educational Activities Department, Transactions on Knowledge and Data Engineering, vol. 13, No. 1, Jan. 2001, pp. 96-111.
Kou, et al., "Spatial Weighted Outlier Detection", retrieved on Dec. 12, 2008 at <<http://www.siam.org/proceedings/datamining/2006/dm06__072kouy.pdf>>, SIAM Conference on Data Mining, 2006, pp. 614-618.

(56) References Cited

OTHER PUBLICATIONS

Krumm, et al., "LOCADIO: Inferring Motion and Location from Wi-Fi Signal Strengths", retrieved on Aug. 4, 2009 at <<http://research.microsoft.com/en-us/um/people/horvitz/locadio.pdf>>, Proceedings of Mobiquitous 2004, 2004, pp. 4-13.

Krumm, et al., "Predestination: Inferring Destinations from Partial Trajectories", retrieved on Aug. 8, 2009 at <<http://research.microsoft.com/en-us/um/people/horvitz/predestination.pdf>>, UBICOMP 2006, 2006, pp. 1-18.

Krumm, et al., "Predestination: Where Do You Want to Go Today?", retrieved on Aug. 4, 2009 at <<http://research.microsoft.com/en-us/um/people/horvitz/predestination-ieee.pdf>>, IEEE Computer Magazine, vol. 40, No. 4, Apr. 2007, pp. 105-107.

Lavondes, et al., "Geo::PostalAddress—Country-specific postal address parsing/formatting", retrieved on Dec. 16, 2008 at <<http://search.cpan.org/~pauamma/Geo-PostalAddress-0.04/PostalAddress.pm>>, CPAN, 2004, pp. 1-8.

Lee, et al., "TraClass: Trajectory Classification Using Hierarchical Region-Based and Trajectory-Based Clustering", retrieved on Aug. 4, 2009 at <<http://www.cs.uiuc.edu/homes/hanj/pdf/vldb08_jglee.pdf>>, ACM, VLDB 2008, vol. 1, Issue 1, 2008, pp. 1081-1094.

Lee, et al., "Trajectory Clustering: A Partition-and-Group Framework", retrieved on Aug. 4, 2009 at <<http://www.cs.uiuc.edu/homes/hanj/pdf/sigmod07_jglee.pdf>>, ACM, SIGMOD 2007, 2007, pp. 1-12.

Lee, et al., "Trajectory Outlier Detection: A Partition-and-Detect Framework", retrieved on Aug. 4, 2009 at <<http://www.cs.uiuc.edu/homes/hanj/pdf/icde08_jaegil_lee.pdf>>, IEEE Computer Society, ICDE 2008, 2008, pp. 1-10.

Lemire, Maclachlan, "Slope One Predictors for Online Rating-Based Collaborative Filtering", retrieved on Dec. 29, 2009 at <<http://www.daniel-lemire.com/fr/documents/publications/lemiremaclachlan_sdm05.pdf>>, SIAM Proceedings of Data Mining (SDM), 2005, pp. 1-5.

Li, et al., "A Connectivity-Based Map Matching Algorithm", AARS, Asian Journal of Geoinformatics, 2005, vol. 5, No. 3, pp. 69-76.

Li, et al., "Traffic Density-Based Discovery of Hot Routes in Road Networks", Springer-Verlag, Advances in Spatial and Temporal Databases, 2007, pp. 441-459.

Liao, et al., "Building Personal Maps from GPS Data", retrieved on Aug. 4, 2009 at <<http://luci.ics.uci.edu/predeployment/websiteContent/weAreLuci/biographies/faculty/djp3/LocalCopy/JR-004.pdf>>, Proceedings of IJCAI MOO 2005, 2005, pp. 249-265.

Liao, et al., "Learning and Inferring Transportation Routines", Elsevier, Artificial Intelligence, vol. 171, Issues 5-6, Apr. 2007, pp. 311-331.

Mamoulis, Cao, Kollios, Hadjieleftheriou, Tao, Cheung, "Mining, Indexing, and Querying Historical Spatiotemporal Data", retrieved on Dec. 29, 2009 at <<http://i.cs.hku.hk/~nikos/sigkdd2004_1.pdf>>, ACM Proceedings of Conference on Knowledge Discovery and Data Mining (KDD), Aug. 22, 2004, pp. 236-245.

Markowetz, et al., "Design and Implementation of a Geographic Search Engine", Eighth International Workshop on the Web Databases (WebDB 2005), Baltimore, MD, Jun. 16-17, 2005, Baltimore, MD, 6 pages.

Masoud, et al., "Fast Algorithms for Outlier Detection", retrieved on Dec. 12, 2008 at <<http://www.scipub.org/fulltext/jcs/jcs42129-132.pdf>>, Journal of Computer Science, vol. 4, No. 2, 2008, pp. 129-132.

McKeown, et al., "Integrating Multiple Data Representations for Spatial Databases", retrieved on Dec. 12, 2008 at <<http://mapcontext.com/autocarto/proceedings/auto-carto-8/pdf/integrating-multiple-data-representations-for-spatial-databases.pdf>>, Auto Carto 8 Conference Proceedings (ASPRS and ACSM), 1987, pp. 754-763.

Miller, "Analysis of Fastest and Shortest Paths in an Urban City Using Live Vehicle Data from a Vehicle-to-Infrastructure Architecture", retrieved on Dec. 24, 2009 at <<http://www.sigmacoding.com/jeff/publications/fastest-path-ifac09.pdf>>, Federation on Automatic Control Symposium on Control in Transportation Systems (IFAC), Sep. 2009, pp. 1-5.

Miyaki, et al., "Tracking Persons Using Particle Filter Fusing Visual and Wi-Fi Localizations for Widely Distributed Camera", retrieved on Aug. 4, 2009 at <<http://ieeexplore.ieee.org/stamp/stamp.jsp?arnumber=04379287>>, IEEE Intl Conference on Image Processing, ICIP 2007, vol. 3, 2007, pp. 225-228.

Monreale, et al., "WhereNext: a Location Predictor on Trajectory Pattern Mining", retrieved Aug. 4, 2009 at <<http://delivery.acm.org/10.1145/1560000/1557091/p637-monreale.pdf?key1=1557091&key2=5182739421&coll=GUIDE&dl=GUIDE&CFID=47499709&CFTOKEN=90308932>>, ACM, KDD 2009, 2009, pp. 637-645.

Morimoto, "Mining Frequent Neighboring Class Sets in Spatial Databases", retrieved on Dec. 29, 2009 at <<http://delivery.acm.org/10.1145/510000/502564/p353-morimoto.pdf?key1=502564&key2=1634712621&coll=GUIDE&dl=GUIDE&CFID=70432903&CFTOKEN=93744375>>, ACM Proceedings of Conference on Knowledge Discovery and Data Mining (KDD), 2001, pp. 353-358.

Morse, Patel, "An Efficient and Accurate Method for Evaluating Time Series Similarity", retrieved on Apr. 15, 2010 at <<http://www.eecs.umich.edu/db/files/sigmod07timeseries.pdf>>, ACM, Proceedings of Conference on Management of Data, Jun. 11, 2007, pp. 569-580.

Nicholson, "Finding the Shortest Route Between Two Points in a Network", British Computer Society, The Computer Journal, 1996, vol. 9, No. 3, pp. 275-280.

Patterson, et al., "Inferring High-Level Behavior from Low-Level Sensors", Springer-Verlag Berlin Heidelberg, Lecture Notes in Computer Science, International Conference on Ubiquitous Computing, 2003, vol. 2864, pp. 73-89.

Patterson, et al., "Inferring High-Level Behavior from Low-Level Sensors", retrieved on Aug. 4, 2009 at <<http://www.cs.rochester.edu/u/kautz/papers/High-Level-140.pdf>>, UBICOMP 2003, pp. 1-18.

Pfoser et al., "Novel Approaches in Query Processing for Moving Object Trajectories", Proceedings of the 26th International Conference on Very Large Data Bases (VLDB 2000), Cairo, Egypt, Sep. 10-14, 2000, pp. 395-406.

Pfoser, et al., "Capturing the Uncertainty of Moving-Object Representations", Springer-Verlag, In the Proceedings of the 6th International Symposium on Advances in Spatial Databases, Lecture Notes in Computer Science, 1999, vol. 1651, pp. 111-131.

Popivanov, et al., "Similarity Search Over Time-Series Data Using Wavelets", Proceedings of the 18th International Conference on Data Engineering (ICDE'02),IEEE Computer Society, San Jose, CA, Feb. 26-Mar. 1, 2002, 10 pages.

Quddus, et al. "Current Map-Matching Algorithms for Transport Applications: State-of-the-Art and Future Research Directions", Elsevier Ltd., Transportation Research Part C: Emerging Technologies, 2007, vol. 15, Issue 5, pp. 312-328.

Rekimoto, et al., "LifeTag: WiFi-based Continuous Location Logging for Life Pattern Analysis", retrieved on Aug. 4, 2009 at <<http://209.85.229.132/search?q=cache:fCil8hzKWxQJ:www.sonycsl.co.jp/person/rekimoto/papers/loca07.pdf+mining+individual+life+pattern+based+on+location+history&cd=5&hl=en&ct=clnk&gl=uk>>, LoCA 2007, 2007, pp. 35-49.

Roussopoulos, Kelley, Vincent, "Nearest Neighbor Queries", retrieved on Apr. 15, 2010 at <<http://www.cs.umd.edu/~nick/papers/nncolor.pdf>>, ACM, Presentation: Conference on Management of Data, 1995, pp. 1-23.

Saltenis, "Outlier Detection Based on the Distribution of Distances between Data Points", retrieved on Dec. 12, 2008 at <<http://www.mii.It/informatica/pdf/INFO558.pdf>>, Informatica, vol. 15, No. 3, 2004, pp. 399-410.

Salton, et al., "A Vector Space Model for Automatic Indexing", Communications of the ACM, vol. 187, No. 11, Nov. 1975, pp. 613-620.

Salton, "Dynamic Document Processing", Communications of the ACM, vol. 15, Issue 7, Jul. 1972, pp. 658-668.

(56) References Cited

OTHER PUBLICATIONS

Schonfelder, "Between Routines and Variety Seeking: The Characteristics of Locational Choice in Daily Travel", retrieved on Dec. 12, 2008 at <<http://www.ivt.ethz.ch/vpl/publications/reports/ab192.pdf>>, 10th International Conference on Travel Behaviour Research, Aug. 10-15, 2003, pp. 1-32.

Sellen, et al., "Do Life-Logging Technologies Support Memory for the Past? An Experimental Study Using SenseCam", available at least as early as Nov. 16, 2007, at <<http://research.microsoft.com/sds/papers/SensecamMemCHICamRdy.pdf>>, pp. 10.

"Share My Routes", retrieved on Apr. 15, 2010 at <<http://www.sharemyroutes.com/>>, 2010, pp. 1-2.

Sherkat, Rafiei, "On Efficiently Searching Trajectories and Archival Data for Historical Similarities", retrieved on Apr. 15, 2010 at <<http://webdocs.cs.ualberta.ca/~drafiei/papers/vldb08.pdf>>, VLDB Endowment, Proceedings of Conference on Very Large Data Bases (VLDB), vol. 1, No. 1, Aug. 24, 2008, pp. 896-908.

Sohn, et al., "Mobility Detection Using Everyday GSM Traces", retrieved on Aug. 4, 2009 at <<http://www.placelab.org/publications/pubs/mobility-ubicomp2006.pdf>>, UBICOMP 2006, 2006, pp. 212-224.

Taylor, et al., "Virtual Differential GPS & Road Reduction Filtering by Map Matching", In the Proceedings of ION'99, Twelfth International Technical Meeting of the Satellite Division of the Institute of Navigation, 1999, pp. 1675-1684.

Tsoukatos, et al., "Efficient Mining of Spatiotemporal Patterns", Proceedings of the 7th International Symposium on Spatial and Temporal Databases LNCS 2121, Redondo Beach, CA, Jul. 12-15, 2001, pp. 425-442.

Vlachos, Kollios, Gunopulos, "Discovering Similar Multidimensional Trajectories", retrieved on Apr. 15, 2010 at <<http://www.google.co.in/url?sa=t&source=web&ct=res&cd=1&ved=0CAcQFjAA&url=http%3A%2F%2Fciteseerx.ist.psu.edu%2Fviewdoc%2Fdownload%3Fdoi%3D10.1.1.106.1984%26rep%3Drep1%26type%3Dpdf&rct=j&q=Discovering+similar+multidimensional+trajectories&ei=ivfGS6HCM4uj_ga3wOiBDQ&usg=AFQjCNG20j6K3s_WuY-VhWeDjIPYpgxv1Q>>, IEEE Computer Society, Proceedings of Conference on Data Engineering (ICDE), 2002, pp. 673-684.

Wang, et al., "CLOSET+: Searching for the Best Strategies for Mining Frequent Closed Itemsets", retrieved on Aug. 4, 2009 at <<http://www.cs.umd.edu/~samir/498/wang03closet.pdf>>, ACM, SIGKDD 2003, 2003, pp. 236-245.

Winogard, "Dynamic Cartograms for Navigating Geo-referenced Photographs", available at least as early as Nov. 16, 2007, at <<http://cs.stanford.edu/research/project.php?id=289>>, pp. 2.

Xiao, Xie, Luo, Ma, "Density Based Co-Location Pattern Discovery", retrieved on Dec. 29, 2009 at <<http://www.cse.ust.hk/~xiaoxy/pub/gis-08.pdf>>, ACM Proceedings of Conference on Advances in Geographic Information Systems (SIGSPATIAL), OLAP and co-location mining, Article 29, Nov. 5, 2008, pp. 1-10.

Xie, Zheng, "GeoLife: Building social networks using human location history", retrieved on Apr. 15, 2010 at <<http://research.microsoft.com/en-us/projects/geolife/>>, Microsoft Corporation, 2010, pp. 1-8.

Xue, "Efficient Similarity Search in Sequence Databases", retrieved on Apr. 15, 2010 at <<http://www.cs.uwaterloo.ca/~david/cs848/presentation-similarity-fengxue.pdf>>, University of Waterloo, Ontario Canada, Course Paper: CS 860 Topics in Database Systems, Nov. 18, 2009, pp. 1-7.

Yan, et al., "Clospan: Mining Closed Sequential Patterns in Large Datasets", retrieved on Aug. 4, 2009 at <<http://citeseerx.ist.psu.edu/viewdoc/download;jsessionid=AFADA02A222CC497F30CEC7317F6C7A5?doi=10.1.1.12.3538&rep=rep1&type=pdf>>, Proceedings of SIAM Int. Conference on Data Mining, SDM 2003, 2003, pp. 166-177.

Yan, et al., "Feature-based Similarity Search in Graph Structures", ACM Transactions on Database Systems, vol. V, No. N, Jun. 2006, 36 pages.

Yavas, et al., "A data mining approach for location prediction in mobile environments", retrieved on Aug. 4, 2009 at <<http://www.cs.bikent.edu.tr/~oulusoy/dke05.pdf>>, Elsevier B.V., 2004, pp. 121-146.

Yi, Jagadish, Faloutsos, "Efficient Retrieval of Similar Time Sequences under Time Warping", retrieved on Apr. 15, 2010 at <<http://www.google.co.in/url?sa=t&source=web&ct=res&cd=3&ved=0CBYQFjAC&url=http%3A%2F%2Fciteseerx.ist.psu.edu%2Fviewdoc%2Fdownload%3Fdoi%3D10.1.1.105.6211%26rep%3Drep1%26type%3Dpdf&rct=j&q=Efficient+retrieval+of+similar+time+sequences+under+time+warping&ei=4ffGS5ShA4_0_Aalk5z8DA&usg=AFQjCNEkCq5vQwgb6OQfZmT_RWcgMZ2YNA>>, IEEE Computer.

Zhang, Mamoulis, Cheung, Shou, "Fast Mining of Spatial Collocations", retrieved on Dec. 29, 2009 at <<http://i.cs.hku.hk/~dcheung/publication/sigkdd2004_2.pdf>>, ACM Proceedings of Conference on Knowledge Discovery and Data Mining (SIGKDD), Aug. 22, 2004, pp. 384-393.

Zhang, et al., "Mining Non-Redundant High Order Correlations in Binary Data", International Conference on Very Large Data Bases (VLDB), Aukland, NZ, Aug. 23-28, 2008, pp. 1178-1188.

Zhao, et al., "Searching for Interacting Features", Proceedings of the 20th International Joint Conference on Artificial Intelligence, Hyderabad, India, Jan. 6-12, 2007, pp. 1156-1161.

Zheng, et al., "GeoLife: Managing and Understanding Your Past Life over Maps", IEEE Computer Society, In the Proceedings of the Ninth International Conference on Mobile Data Management, 2008, pp. 211-212, 2 pgs.

Zheng, Wang, Zhang, Xie, Ma, "GeoLife: Managing and Understanding Your Past Life over Maps", retrieved on Dec. 29, 2009 at <<http://research.microsoft.com/en-us/people/yuzheng/zheng-geolife-managing_and_understanding_your_past_life_over_map.pdf>>, IEEE Computer Society, Proceedings of Conference on Mobile Data Manage, 2008, pp. 211-212.

Zheng, Li, Chen, Xie, Ma, "Understanding Mobility Based on GPS Data", retrieved on Dec. 29, 2009 at <<http://delivery.acm.org/10.1145/1410000/1409677/p312-zheng.pdf?key1=1409677&key2=0364712621&coll=GUIDE&dl=GUIDE&CFID=70433597&CFTOKEN=93582958>>, ACM Proceedings of Conference on Ubiquitous Computing (UbiComp), vol. 344, Sep. 21, 2008, pp. 312-321.

Abowd et al., "Cyberguide: A mobile context-aware tour guide", Wireless Networks, vol. 3, 1997, pp. 421-433, retrieved on Apr. 30, 2010 at <<http://graphics.cs.columbia.edu/courses/mobwear/resources/p421-abowd-97.pdf>>.

Ankerst et al., "OPTICS: Ordering Points to Identify the Clustering Structure", Proceedings of the ACM SIGMOD 1999 International Conference on Management of Data, Philadelphia, Pennsylvania, Jun. 1-3, 1999, 12 pages, retrieved Apr. 10, 2010 at <<http://www.dbs.informatik.uni-muenchen.de/Publicationen/Papers/OPTICS.pdf>>.

"Bikely Reviews", website, 2010, 1 page, retrieved on Apr. 16, 2010 at <<http://www.bikely.com/>>.

Chen et al., "GeoTV: Navigating Geocoded RSS to Create an IPTV Experience", Proceedings of the 16th International World Wide Web Conference (WWW 2007), Banff, Alberta, Canada, May 8-12, 2007, pp. 1323-1324, retrieved Apr. 30, 2010 at <<http://www2007.org/posters/poster1042.pdf>>.

Chen et al., "Searching Trajectories by Locations—An Efficiency Study", 2010 Microsoft Research, to be presented at the ACM Conference on Management of Data (SIGMOD), Indianapolis, Indiana, Jun. 6-11, 2010, 12 pages, retrieved on Apr. 16, 2010 at <<http://www.itee.uq.edu.au/~zxf/_papers/sigmod299-chen.pdf>>.

"GPS Track Route Exchange Forum", 2010 GPSXchange.com website, 3 pages, retrieved on Apr. 16, 2010 at <<http://www.gpsxchange.com/phpBB2/index.php>>.

Horozov et al., "Using Location for Personalized POI Recommendations in Mobile Environments", Proceedings of the 2006 International Symposium on Applications and the Internet (SAINT 2006), Phoenix, Arizona, Jan. 23-27, 2006, pp. 124-129.

Li et al., "Mining User Similarity Based on Location History", ACM Conference on Advances in Geographic Information Systems (ACM GIS 2008), Irvine, California, Nov. 5-7, 2008, Article 34, 10 pages,

(56) References Cited

OTHER PUBLICATIONS retrieved on Apr. 16, 2010 at <<http://research.microsoft.com/pubs/74369/Mining%20user%20similarity%20based%20on%20location%20history.pdf>>.
Takeuchi et al., "CityVoyager: An Outdoor Recommendation System Based on User Location History", Proceedings of the 3rd International Conference on Ubiquitous Intelligence and Couputing (UIC 2006), Wuhan, China, Sep. 3-6, 2006, pp. 625-636.
Liao et al., "Learning and Inferring Transportation Routines", American Association for Artificial Intelligence Press (AAAI) 19th National Conference on Artificial Intelligence, San Jose, California, Jul. 25-29, 2004, pp. 348-353, retrieved on Apr. 16, 2010 at <<http://www.cs.rochester.edu/~kautz/papers/gps-tracking.pdf>>.
Liao et al., "Location-based Activity Recognition", Proceedings of the 19th Annual Conference on Neural Information Processing Systems (NIPS-2005), Whistler, British Columbia, Canada, Dec. 5-10, 2005, 8 pages, retrieved on Apr. 16, 2010 at <<http://books.nips.cc/papers/files/nips18/NIPS2005_0773.pdf>>.
Manning et al., "An Introduction to Information Retrieval", DRAFT, Cambridge University Press, Apr. 1, 2009, 581 pages, retrieved on Apr. 16, 2001, <<http://nlp.stanford.edu/IR-book/pdf/irbookonlinereading.pdf>>.
Park et al., "Location-Based Recommendation System Using Bayesian User's Preference Model in Mobile Devices", J. Indulska et al. (Eds.): UIC 2007, LNCS 4611, pp. 1130-1139, retrieved on Apr. 30, 2010 at <<http://sclab.yonsel.ac.kr/publications/paper/IC/UIC07-MHPark.pdf>>.
Simon, Frohlich, "A Mobile Application Framework for the geospatial Web", retrieved on Apr. 16, 2010 at <<http://www2007.org/papers/paper287.pdf>>, ACM, Proceedings of World Wide Web Conference (WWW), May 8, 2007, pp. 381-390.
Singh et al., "Relational Learning via Collective Matrix Factorization", Proceedings of the 14th ACM SIGKDD International Conference on Knowledge Discovery and Data Mining, Las Vegas, Nevada, Aug. 24-27, 2008, pp. 650-658, retrieved on Apr. 30, 2010 at <<http://www.cs.cmu.edu/-ggordon/CMU-ML-08-109.pdf>>.
Srebro et al., "Weighted Low-Rank Approximations", Proceedings of the 20th International Conference on Machine Learning (ICML-2003), Washington, DC, Aug. 21-24, 2003, 8 pages, retrieved on Apr. 30, 2010 at <<http://people.scail.mit.edu/tommi/papers/SreJaa-icmI03.pdf>>.
Takeuchi et al., "An Outdoor Recommendation System Based on User Location History", Proceedings of the 1st International Workshop on Personalized Context Modeling and Management for UbiComp Applications (ubiPCMM 2005), Tokyo, Japan Sep. 11, 2005, pp. 91-100.
Wang et al., "An Optimized Location-based Mobile Restaurant Recommend and Navigation System", WSEAS Transactions on Information Science and Applications, vol. 6, Issue 5, May 2009, pp. 809-818, retrieved on Apr. 16, 2010 at <<http://www.wseas.us/e-library/transactions/information/2009/29-186.pdf>>.
Wang et al., "Unifying User-based adn Item-based Collaborative Filtering Approaches by Similarity Fusion", Proceedings of the 29th Annual International ACM SIGIR Conference on Research and Development in Information Retrieval, Seattle, Washington, Aug. 6-11, 2006, pp. 501-508 retrieved on Apr. 30, 2010 at <<http://ict.ewi.tudelft.nl/pub/jun/sigir06_similarityfuson.pdf>>.
Ward et al., "Unsupervised Activity Recognition Using Automatically Mined Common Sense", American Association for Artificial Intelligence (AAAI 2005), Proceedings of the 20th National Conference on Artificial Intelligence, Pittsburgh, Pennsylvania, Jul. 9-13, 2005, 7 pages, retrieved Apr. 30, 2010 at <<http://www.cs.dartmouth,edu/-tanzeem/pubs/AAA1051WyattD.pdf>>.
Zheng et al., "Collaborative Filtering Meets Mobile Recommendation: A User-centered Approach", to be presented at the Association for the Advancement of Artificial Intelligence (AAAI) 24th Conference on Artificial Intelligence, Atlanta, Georgia, Jul. 11-15, 2010, 6 pages., retrieved on Apr. 16, 2010 at <<http://research.microsoft.com/pubs/122244/AAAI10-Collaborative%20Filtering%20Meets%20Mobile%20Recommendation%20A%20User-centered%20Approach.pdf>>.
Zheng et al., "GeoLife2.0: A Location-Based Social Networking Service", Proceedings of the 10th International Conference on Mobile Data Management Systems, Services and Middleware, Taipei, Taiwan, May 18-20, 2009, pp. 357-358, retrieved on Apr. 16, 2010 at <<http://ieeexplore.ieee.org/stamp/stamp.jsp?tp=&arnumber=5088957>>.
Zheng et al., "Joint Learning User's Activities and Profiles from GPS Data", ACM Geographic Information Systems Workshop on Location Based Social Networks (ACM LBSN 2009), Seattle, Washington, Nov. 3, 2009, pp. 17-20, retrieved on Apr. 16, 2010 at <<http://delivery.acm.org/10.1145/1630000/1629894/p17-zheng.pdf?key1=1629894&key2=6324041721&coll=GUIDE&dl=GUIDE&CFID=86381688&CFTOKEN=49903381>>.
Zheng et al., "Learning Transportation Mode from Raw GPS Data for Geographic Applications on the Web", ACM Conference on World Wide Web (ACM WWW 2008)), Apr. 21, 2008, pp. 247-256, retrieved on Apr. 16, 2010 at <<http://research.microsoft.com/pubs/78567/fp485-Zheng.pdf>>.
Zheng et al., "Microsoft GeoLife Project, GeoLife: Building social networks using human location history", Microsoft Research, 2009, 4 pages, retrieved on Apr. 16, 2010 at <<http://research.microsoft.com/en-us/projects/geolife/default.aspx>>.
Zheng et al., "Mining Interesting Locations and Travel Sequences from GPS Trajectories", Proceedings of the 18th International Conference on World Wide Web (WWW 2009), Madrid, Spain, Apr. 20-24, 2009, pp. 791-800, retrieved on Apr. 16, 2010 at <<http://research.microsoft.com/pubs/79440/fp120-zheng.pdf>>.
Zheng et al., "Recommending Friends and Locations Based on Individual Location History", ACM Trans. Asian Language Information Processing, vol. 6, No. 3, Article 9, Ch. 45, Nov. 2007, 47 pages, retrieved on Apr. 16, 2010 at <<http://research.microsoft.com/pubs/122435/Recommending%20friends%20and%20locations%20based%20on%20individual%20location%20history.pdf>>.
Borzsonyi, et al., The Skyline Operator, In Proc. ICDE 2001, IEEE Press: 421-430, <<http://ieeexplore.ieee.org/stamp/stamp.jsp?tp=&arnumber=914855>>.
Brauckhoff, et al., Applying PCA for Traffic Anomaly Detection: Problems and Solutions, IEEE, 2009, 5 pages.
Brkic, et al., Generative modeling of spatio-temporal traffic sign trajectories, Proceedings of the IEEE Conference on Computer Vision and Pattern Recognition, 2010, pp. 25-31, <<http://www.zemris.fer.hr/~ssegvic/pubs/brkicl0ucvp.pdf>>.
Bu, et al., Efficient Anomaly Monitoring Over Moving Object Trajectory Streams, KDD 2009, ACM, 2009, 9 pages.
Chen, et al., GLS-SOD: A Generalized Local Statistical Approach for Spatial Outlier Detection, Proceedings of KDD 2010, ACM, 2010, pp. 1069-1078.
Cranshaw, et al., Bridging the Gap between the Physical Location and Online Social Networks, In Proc. Ubicomp 2010, ACM Press (2010), <<http://www.eng.tau.ac.il/~eran/papers/Cranshaw_Bridging_the_Gap.pdf>>.
Das, et al., Anomaly Detection and Spatial-Temporal Analysis of Global Climate System, Proceedings of SensorKDD 2009, 9 pages, 2009 ACM.
Eagle, et al., Community Computing: Comparisons between Rural and Urban Societies using Mobile Phone Data, IEEE Social Computing, 144-150, <<http://reality.media.mit.edu/pdfs/Eagle_community.pdf>>.
Eagle, et al., Reality mining: sensing complex social systems. Personal Ubiquitous Computing, 10, 4: 255-268, 2006. <<http://robotics.usc.edu/~sameera/CS546/readings/eagle_uc2006.pdf>>.
Estkowski, No Steiner Point Subdivision Simplification is NP-Complete, In Proceedings of the 10th Canadian Conference on Computational Geometry, pp. 11-20, 1998.
Ge, et al., An Energy-Efficient Mobile Recommender System. In Proc. KDD 2010, ACM Press 2010, <<http://pegasus.rutgers.edu/~kelixiao/papers/An%20Energy-Efficient%20Mobile%20Recommender%20System.pdf>>.
Ge, et al., TOP-EYE: Top-k Evolving Trajectory Outlier Detection, Proceedings of CIKM 2010, Toronto, Canada, 4 pages.
Guehnemann, et al., Monitoring traffic and emissions by floating car data. Institute of transport studies Australia; 2004, <<http://elib.dlr.de/6675/1/its_wp_04-07.pdf>>.

(56) References Cited

OTHER PUBLICATIONS

Hirose, et al., Network Anomaly Detection based on Eigen Equation Compression, In Proceedings of the 15th SIGKDD Conference on Knowledge Discovery and Data Mining, pp. 1185-1194, 2009 ACM. <<http://www.ibis.t.u-tokyo.ac.jp/yamanishi/ID361_Network_Anomaly_Detection.pdf>>.
Kindberg, et al., Urban computing. Pervasive computing. IEEE Computer Society. 6, 3, pp. 18-20. Aug. 2007, <<http://ieeexplore.ieee.org/stamp/stamp.jsp?tp=&arnumber=4287439&userType=inst>>.
Kostakos, et al., Urban computing to bridge online and real-world social networks. Handbook of Research on Urban Informatics, 2008, <<http://hci.uma.pt/courses/ubicomp/papers/social/kostakos-08.pdf>>.
Lakhina, et al., Diagnosing Network-Wide Traffic Anomalies, In Proceedings of the SIGCOMM 2004 Conference, 12 pages, 2004 ACM.
Lee, et al., Trajectory Clustering: A Partition-and-group Framework, In Proceedings of the 26th ACM SIGMOD International Conference on Management of Data 2007, pp. 593-604, 2007.
Li, et al., Temporal Outlier Detection in Vehicle Traffic Data, Proceedings of the 2009 IEEE International Conference on Data Engineering, pp. 1319-1322, <<http://www.cs.uiuc.edu/~hanj/pdf/icde09_xli.pdf>>.
Liao, et al., Anomaly Detection in GPS Data Based on Visual Analytics, Proceedings of the 2010 IEEE Symposium, Oct. 2010, pp. 51-58, <<http://web.siat.ac.cn/~baoquan/papers/GPSvas.pdf>>.
Lippi, et al., Collective Traffic Forecasting, Proceedings of the European Conference on Machine Learning and Principles and Practice of Knowledge Discovery Database, ECML PKDD 2010, pp. 259-273, 2010.
Liu, et al., Uncovering cabdrivers' behavior patterns from their digital traces, Computers, Environment and Urban Systems, 2010.
Lozano, et al., Spatial-temporal Causal Modeling for Climate Change Attribution, KDD 2009, Paris France, ACM 2009, 10 pages.
Nzouonta, et al, VANET Routing on City Roads using Real-Time Vehicular Traffic Information, IEEE Transactions on Vehicular Technology, vol. 58, No. 7, Sep. 2009, <<http://web.njit.edu/~gwang/publications/TVT09.pdf>>.
Pelekis, et al., Unsupervised Trajectory Sampling, Proceedings of the European Conference on Machine Learning and Principles and Practice of Knowledge Discovery in Databases ECML PKDD 2010, pp. 17-33, 2010.
Ringberg, et al., Sensitivity of PCA for Traffic Anomaly Detection, SIGMETRICS 2007, pp. 109-120.
Rosenfeld, Connectivity in digital pictures. Journal of the ACM (JACM), 17(1):160, 1970.
Rosenfeld, Connectivity in digital pictures, Journal of the ACM 17 (1): pp. 146-160, 1970.
Shekhar, et al., Unified approach to detecting spatial outliers, University of Helsinki 2007, 27 pages, <<http://www.cs.helsinki.fi/u/leino/opetus/spatial-k07/maksimainen.pdf>>.
Shklovski, et al., Urban Computing-Navigating Space and Context. IEEE Computer Society. 39 ,9, pp. 36-37, 2006 <<http://www.itu.dk/people/irsh/pubs/UrbanComputingIntro.pdf>>.
Sun, et al., On Local Spatial Outliers, Technical Report No. 549, Jun. 2004, <<http://sydney.edu.au/engineering/it/research/tr/tr549.pdf>>, 9 pages.
Wu, et al., Spatio-Temporal Outlier Detection in Precipitation Data, Knowledge Discovery from Sensor Data, pp. 115-133, 2010, <<http://sydney.edu.au/engineering/it/~ewu1/publications/WuLiuChawlaSensorKDD2008.pdf>>.
Yan, et al., Discovery of frequent substructures, Wiley-Interscience, 2007, 99-113.
Yuxiang, et al., Detecting Spatio-temporal Outliers in Climate Dataset: A Method Study, IEEE 2005, pp. 760-763.
Zhang, et al., iBAT: Detecting Anomalous Taxi Trajectories from GPS Traces, Proceedings of UbiComp Sep. 2011, 10 pages.
Zhang, et al., Network Anomography, USENIX Association, Internet Measurement Conference 2005, pp. 317-330.
Zheng, et al., GeoLife: A Collaborative Social Networking Service among User, Location and Trajectory. IEEE Date Engineer Bulletin, 33(2). IEEE press 2010, 32-40, <<http://sites.computer.org/debull/A10june/geolife.pdf>>.
Zheng, et al., Recommending friends and locations based on individual location history. In ACM Transaction on the Web, 2011, 44 pages, <<http://research.microsoft.com/pubs/122435/RecomFriend-zheng-Published.pdf>>.
Zheng, et al., T-Drive: Driving Directions based on Taxi Trajectories, In Proc. ACM SIGSPATIAL GIS 2010. ACM Press , 2010, 10 pages, <<http://www.cse.unt.edu/~huangyan/6350/paperList/T-Drive.pdf>>.
Ziebart, et al., Navigate like a cabbie: Probabilistic reasoning from observed context-aware behavior. In Proc. Ubicomp 2008, pp. 322-331, <<http://citeseerx.ist.psu.edu/viewdoc/download?doi=10.1.1.141.7187&rep=rep1&type=pdf>>.
Min-qi, et al., "An Algorithm for Spatial Outlier Detection Based on Delaunay Triangulation", In the Proceedings of the 2008 International Conference on Computational Intelligence and Security, Dec. 2008, pp. 102-107.
Office Action for U.S. Appl. No. 12/353,940, mailed on Mar. 23, 2012, Yu Zheng, "Detecting Spatial Outliers in a Location Entity Dataset", 6 pgs.
Office Action for U.S. Appl. No. 12/711,130, mailed on Mar. 27, 2012, Yu Zheng, "Mining Correlation Between Locations Using Location History", 14 pgs.
Office Action for U.S. Appl. No. 12/567,667, mailed on Jul. 18, 2012, Zheng et al., "Recommending Points of Interests in a Region", 20 pages.
Office Action for U.S. Appl. No. 12/712,053, mailed on Aug. 15, 2012, Zheng et al., "Route Computation Based on Route-Oriented Vehicle Trajectories", 17 pages.
Shekhar, et al., "Data Mining for Selective Visualization of Large Spatial Datasets", In the Proceedings of the 14th IEEE International Conference on Tools with Artificial Intelligence, Nov. 2002, pp. 41-48.
Zhang, et al., "A Taxonomy Framework for Unsupervised Outlier Detection Techniques for Multi-Type Data Sets," Technical Report TR-CTIT-07-79, Centre for Telematics and Information Technology University of Twente, Enschede, Nov. 2007, pp. 1-40.
Office action for U.S. Appl. No. 12/711,130, mailed on Oct. 4, 2012, Zheng et al., "Mining Correlation Between Locations Using Location History", 15 pages.
Tai et al., "Recommending Personalized Scenic Itinerary with Geo-Tagged Photos", ICME, 2008, IEEE Intl Conf on Multimedia and Expo, Apr. to Jun. 2008, 4 pages.
Office action for U.S. Appl. No. 12/353,940, mailed on Nov. 2, 2012, Zheng et al., "Detecting Spatial Outliers in a Location Entity Dataset", 11 pages.
Shekhar et al., "A Unified Approach to Detecting Spatial Outliers", GeoInformatica, vol. 7, Issue 2, Jun. 2003, 28 pages.
Sun, "Outlier Detection in High Dimensional, Spatial and Sequential Data Sets", School of Information Technologies, The University of Sydney, Thesis, Septemeber 2006, 118 pages.
Office action for U.S. Appl. No. 12/794,538, mailed on Nov. 29, 2012, Zheng et al. "Searching Similar Trajectories by Locations", 10 pages.
European Search Report mailed Nov. 21, 2012 for European patent application No. 09714738.3, 9 pages.
Office action for U.S. Appl. No. 12/567,667, mailed on Dec. 19, 2012, Zheng et al., "Recommending Points of Interests in a Region", 18 pages.
Shiraishi, "A User-centric Approach for Interactive Visualization and mapping of Geo-sensor Data", Networked Sensing Systems, 2007, INSS, Fourth International Conference on IEEE, Jun. 1, 2007, pp. 134-137.
Spinellis, "Position-Annotated Photographs: A Geotemporal Web", IEEE Pervasive Computing IEEE Service Center, Los Alamintos, CA, vol. 2, No. 2, Apr. 1, 2003, pp. 72-79.
Wang et al., "Spatiotemporal Data Modelling and Management: a Survey", Technology of Object-Oriented Languages and Systems, 2000, ASI, Proceedings of the 36th International Conference on Oct. 30-Nov. 4, 2000, IEEE, pp. 202-211.

(56) References Cited

OTHER PUBLICATIONS

Weng et al., "Design and Implementation of Spatial-temporal Data Model in Vehicle Monitor System", Proceeding of the 8th International Conference on Geocomputation, Aug. 3, 2005, pp. 1-8.
Office action for U.S. Appl. No. 13/324,758, mailed on Jan. 18, 2013, Zheng et al., "Urban Computing of Route-Oriented Vehicles", 48 pages.
Espinoza et al, "GeoNotes: Social and Navigational Aspects of Location-Based Information Systems", Proc Ubicomp 3rd Intl Conf on Ubiquitous Computing, Oct. 2001, LNCS 2201, 16 pgs.
Eustice et al, "The Smart Party: A Personalized Location Aware Multimedia Experience", Consumer Communications and Networking Conf, Jan. 2008, 5 pgs.
GPS Sharing, retrieved Feb. 4, 2013 at http://web.archive.org/web/20071129224158/http://gpssharing.com, 2 pgs.
Hariharan et al, "NetTrust—Recommendation System for Embedding Trust in a Virtual Realm", ACM Recommender Systems, Oct. 2007, 6 pgs.
Intl Search Report for PCT/US2009/063023, mailed Jun. 10, 2010, 4 pgs.
Jarvelin et al, "Cumulated Gain Based Evaluation of IR Techniques", ACM Transactions on Information Systems, vol. 20, No. 4, Oct. 2002, 25 pgs.
Jones et al, "P3 Systems: Putting the Place Back into Social Networks", IEEE Internet Computing, Sep.-Oct. 2005, 9 pgs.
Lee et al, "Efficient Mining of User Behaviors by Temporal Mobile Access Patterns", Intl Journal of Computer Science and Network Security, vol. 7, No. 2, Feb. 2007, 7 pgs.
Linden et al, "Amazon.com Recommendations, Item to Item Collaborative Filtering", IEEE Internet Computing, Jan. and Feb. 2003, 5 pgs.
Matsuo et al, "Inferring Long Term User Properties Based on Users' Location History", Proc 20th Intl Joint Conf on Artificial Intelligence, Jan. 2007, 7 pgs.
McDonald et al, "Expertise Recommender: A Flexible Recommendation System and Architecture", CSCW 2000, Dec. 2000, 10 pgs.
Michael et al, "Location Based Intelligence—Modeling Behavior in Humans Using GPS", Proc Intl Symposium on Technology and Society, Jun. 2006, 8 pgs.
Sarwar et al, "Application of Dimensionality Reduction in Recommender System, A Case Study", ACM WebKDD Workshop, Aug. 2000, 12 pgs.
Spertus et al, "Evaluating Similarity Measures: A Large Scale Study in the Orkut Social Network", Proc 11th ACM SIGKDD Intl Conf on Knowledge Discovery in Data Mining, Aug. 2005, 7 pgs.
Xie, "Understanding User Behavior Geospatially", Microsoft Research, Nov. 2008, 2 pgs.
Domain Name System (DNS), retrieved on Apr. 29, 2008 at <<http://www.unix.org.ua/orelly/networking/firewall/ch08_10.htm>>, Unix, pp. 1-11.
Domain Name System (DNS) A Guide to TCP/IP, retrieved Apr. 29, 2008 at <<http://web.syr.edu/~djmolta/ist452/ch_07.ppt>>, Thomson Learning Course Technology, pp. 1-56.
"Flow Control Platform (FCP) Solutions", retrieved Jul. 5, 2007 at <<http://k2colocation.com/network-services/fcp.cfm>>, K2 Colocation, 2005, pp. 2.
Global Server Load Balancing for Disaster Recovery, Business Continuity, Performance Optimization and Datacenter Management, retrieved Jul. 6, 2007 at <<http://www.zeus.com/documents/en/ZXT/ZXTM_Global_Load_Balancer.pdf>>, Zeus Technology Limited, 1995-2007, pp. 4.
Linden, "The End of Federated Search?", at <<http://glinden.blogspot.com/2007/03/end-of-federated-search.html>>, Mar. 24, 2007, pp. 9.
Office Action for U.S. Appl. No. 12/041,599, mailed on Jul. 25, 2011, Arne Josefsberg, "Failover in an Internet Location Coordinate Enhanced Domain Name System", 22 pgs.
Office action for U.S. Appl. No. 13/188,013, mailed on Nov. 15, 2011, Josefsberg et al., "Internet Location Coordinate Enhanced Domain Name System", 14 pages.
Office action for U.S. Appl. No. 12/353,940, mailed on Feb. 28, 2013, Zheng et al., "Detecting Spatial Outliers in a Location Entity Dataset", 9 pages.
Office Action for U.S. Appl. No. 12/041,599, mailed on Feb. 9, 2012, Arne Josefsberg, "Failover in an Internet Location Coordinate Enhanced Domain Name System", 27 pgs.
Office action for U.S. Appl. No. 12/041,599, mailed on Sep. 21, 2012, Josefsberg et al., "Failover in an Internet Location Coordinate Enhanced Domain Name System", 9 pages.
Park, et al., "CoDNS: Improving DNS Performance and Reliability via Cooperative Lookups", Proc 6th conf on Symposium on Operating Systems Design and Implementation, vol. 6, Dec. 2004, pp. 1-16.
Wikipedia, "Operating System", retrived from <<http://en.wikipedia.org/wiki/Operating_system>> on Oct. 8, 2010, 17 pgs.
Yegulalp, Change the Windows 2000 DNS cache, retrieved on Apr. 29, 2008 at <<http://searchwincomputing.techtarget.com/tip/0,289483,sid68_gci1039955,00.html>>, SearchWinComputing.com, pp. 1-3.
Office action for U.S. Appl. No. 12/712,857, mailed on Aug. 5, 2013, Zheng, et al., "Map-Matching for Low-Sampling-Rate GPS Trajectories", 15 pages.
Office action for U.S. Appl. No. 13/324,758, mailed on Jul. 11, 2013, Zheng et al., "Urban Computing of Route-Oriented Vehicles", 47 pages.
Office action for U.S. Appl. No. 12/794,538, mailed on Sep. 18, 2013, Zheng, et al., "Searching Similar Trajectories by Locations", 12 pages.
Office action for U.S. Appl. No. 12/041,608, mailed on Nov. 22, 2013, Josefsberg, et al., "Client-Side Management of Domain Name Information", 7 pages.
Office action for U.S. Appl. No. 12/794,538, mailed on Nov. 25, 2013, Zheng, et al., "Searching Similar Trajectories by Locations", 18 pages.
Office action for U.S. Appl. No. 12/712,857, mailed on Feb. 21, 2014, Zheng, et al., "Map-Matching for Low-Sampling-Rate GPS Trajectories", 15 pages.
Office action for U.S. Appl. No. 12/567,667, mailed on Feb. 25, 2014, Zheng et al., "Recommending Points of Interests in a Region", 31 pages.
Office action for U.S. Appl. No. 12/353,940, mailed on Mar. 4, 2014, Zheng, et al., "Detecting Spatial Outliers in a Location Entity Dataset", 10 pages.
Liao, et al. "Learning and inferring transportation routines", Artificial Intelligence, vol. 171, Apr. 2007, pp. 311-331.
Office action for U.S. Appl. No. 12/037,347, mailed Jan. 13, 2014, Zheng, et al., "System for Logging Life Experiences Using Geographic Cues", 8 pages.

* cited by examiner

COLLABORATIVE LOCATION AND ACTIVITY RECOMMENDATIONS

BACKGROUND

The increasing popularity of location-based services and their use in people's lives results in the daily collection of global positioning system (GPS) information. A GPS tracking unit identifies a location or tracks movement of a user when the user is in close proximity to a GPS device. The location or movement is recorded via GPS devices or phones. For example, GPS information is often utilized in navigation systems. Users may search for information based on their present GPS location for driving or walking directions to a destination location.

Due to the popularity of location-based services, a wide range of tour guides and location-based social networks are being offered to users through web browsers, search engines, and as applications. The GPS data may be uploaded to the Internet by the users to show their positions, to share experiences, and for a variety of other reasons. For example, the users may access outdoor sports forums to upload and to share their outdoor sports activities.

However, problems exist with being able to use GPS data in raw form, which shows coordinates and time stamps. It may become difficult to identify locations, places in the locations, and events that occur in the locations. Therefore, the GPS raw data needs to be transformed to convey such information.

SUMMARY

This disclosure describes associating location and activity information to recommend a location when given an activity query and/or to recommend an activity when given a location query. In one aspect, a location and activity recommendation service constructs matrices to represent a relationship between locations and activities. A location-activity matrix is constructed by detecting global positioning system (GPS) stay points to represent where an individual has stayed over a time threshold and within a distance threshold. The constructing also includes extracting user comments from GPS data and corresponding these user comments to the stay points in stay regions. Next, a location-feature matrix is constructed by identifying points of interest (POI) in a region from a POI database and determining a number of different points of interest in an enclosing region of stay points. Furthermore, an activity-activity matrix is constructed by generating a query for a pair of activities on a search engine and identifying a correlation between the pair of activities.

In another aspect, a location and activity application creates a location and activity model. The location and activity application applies a collective matrix factorization by propagating data among matrices in the model. A location-activity matrix is filled with data for locations and activities, and a correlation may be inferred between the locations of interest and corresponding activities of interest. The location and activity application then recommends a location and/or an activity based on a user query.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes identifying relationships between locations and activities to recommend a location and/or an activity based on a user query. In one aspect, a location and activity recommendation service constructs a model to represent a relationship between locations and activities. In one example, the model includes matrices with data from different sources. The location and activity recommendation service constructs a location-activity matrix to model the users' location histories and activities. Also, the location and activity recommendation service detects stay points (e.g., a via global positioning system (GPS), triangulation, etc.), extracts user comments from GPS data to correspond to the stay points in stay regions, and parses the comments to identify activities for each stay region. Next, the location and activity recommendation service constructs a location-feature matrix. This occurs by identifying points of interest (POI) in a region from a POI database and determining a number of different points of interest in an enclosing polygon (e.g., a rectangle) of stay points. Next, the location and activity recommendation service constructs an activity-activity matrix by identifying a correlation between a pair of activities. While the following discussion describes the techniques with use of GPS data, other implementations may employ any other technology capable of locating a user and/or a device of the user.

In another aspect, a location and activity application accesses a location and activity recommendation model. The location and activity recommendation application applies a collective matrix factorization to the location and activity recommendation model to identify locations of interest and corresponding activities of interest. The location and activity recommendation application propagates information among a location-activity matrix, a location-feature matrix, and an activity-activity matrix. Once data is filled for the rows and the columns in the location-activity matrix, a correlation may be inferred between locations of interest and activities of interest. The location and activity recommendation application provides recommendations with location and activity constraints, based on the user query.

While aspects of described techniques can be implemented in any number of different computing systems, environments, and/or configurations, implementations are described in the context of the following the example computing environment.

Illustrative Environment

Figure 1:
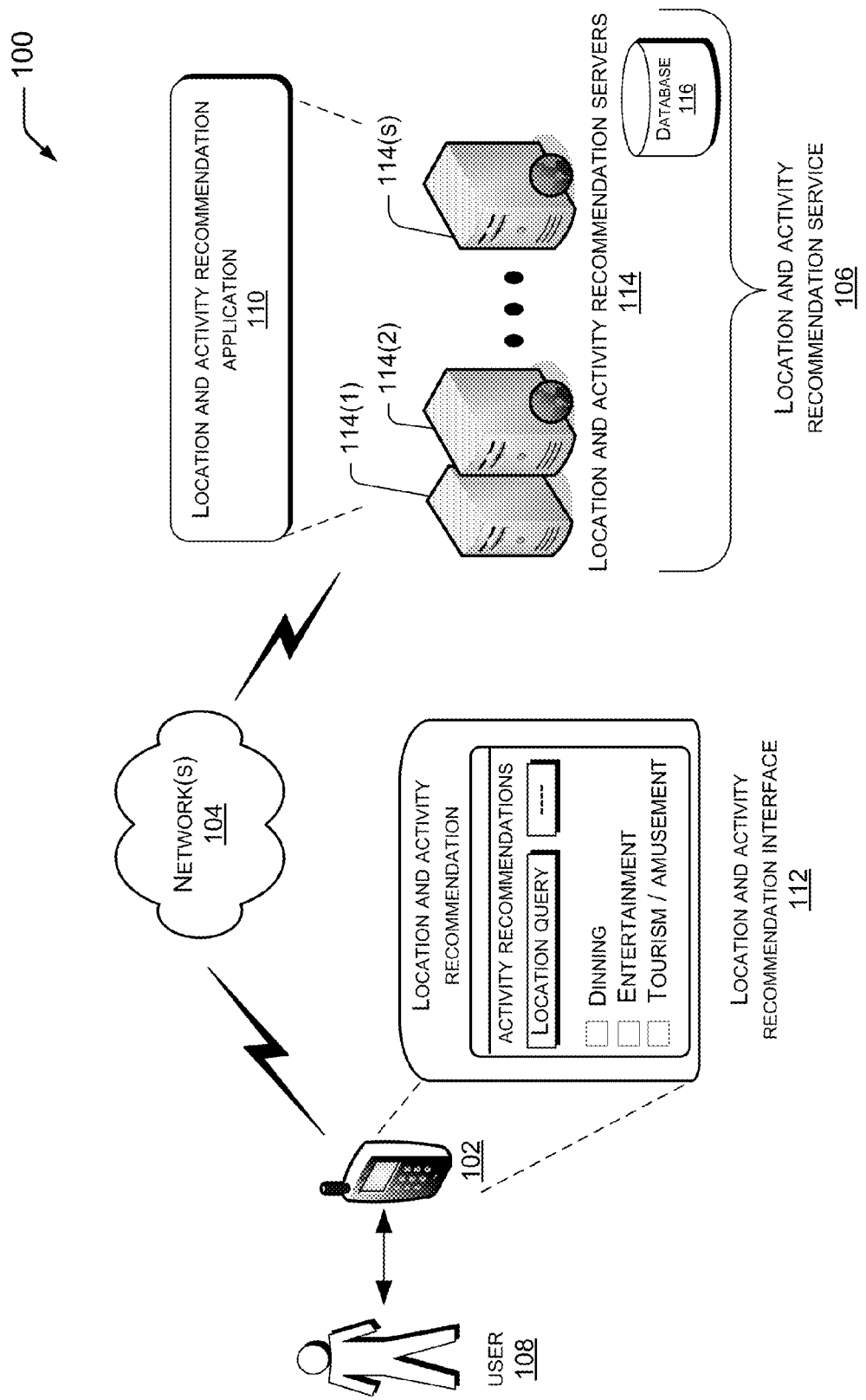
FIG. 1 illustrates an example environment to support an example architecture for recommending a location and/or an activity to a user.

FIG. 1 illustrates an example architectural environment 100, usable to recommend locations and/or activities based on a user query. Alternatively, recommendations may be based on a prediction of a user's interest in a location for activities or a prediction of a user's interest in an activity in locations. The environment 100 includes an example computing device 102, which is illustrated as a smart phone. The computing device 102 is configured to connect via one or more network(s) 104 to access a location and activity recommendation service 106 for a user 108. The computing device 102 may take a variety of forms, including, but not limited to, a portable handheld computing device (e.g., a personal digital assistant, a smart phone, a cellular phone), a personal navigation device, a laptop computer, a desktop computer, a portable media player, or any other device capable of connecting to one or more network(s) 104 to access the location and activity recommendation service 106 for the user 108.

The network(s) 104 represents any type of communications network(s), including wire-based networks (e.g., public switched telephone, cable, and data networks) and wireless networks (e.g., cellular, satellite, WiFi, and Bluetooth).

The location and activity recommendation service 106 represents an application service that may be operated as part of any number of online service providers, such as a search engine, map service, social networking site, or the like. Also, the location and activity recommendation service 106 may include additional modules or may work in conjunction with modules to perform the operations discussed below. In an implementation, the location and activity recommendation service 106 may be implemented at least in part by the location and activity recommendation application 110 executed by servers, or by a location and activity recommendation application stored in memory of the computing device 102. Updates may be sent for the location and activity recommendation application stored on the computing device 102.

In the illustrated example, the computing device 102 may include a location and activity recommendation user interface (UI) 112 that is presented on a display of the computing device 102. The UI 112 facilitates access to the location and activity recommendation service 106 that provides recommendations for locations and/or activities. In one implementation, the UI 112 is a browser-based UI that presents a page received from the location and activity recommendation application 110. The user 108 employs the UI 112 when submitting a location query or an activity query for a recommendation from the location and activity recommendation service 106. For example, the user 108 may access "Activity Recommendation" and input a location query by entering a name of an area, a region, a town, a site, or the like. The UI 112 may allow for the display of a map of a queried location and a recommended list of candidate activities to the user 108. Shown in FIG. 1 is a list of activity recommendations for Dining (food and drinks), Entertainment (theaters for movies, plays, operas), and Tourism/Amusement (sight-seeing locations).

In another implementation, the user 108 may employ the UI 112 to access "Location Recommendation." For example, the user 108 may submit a request for an activity, such as dinning, movies, tourism, theater, biking, hiking, and the like, for location recommendations from the location and activity recommendation service 106. The UI 112 may allow for the display of a recommended list of candidate locations for the queried activity and a map of the recommended candidate locations to the user 108.

In the illustrated example, the location and activity recommendation service 106 is hosted on one or more location and activity recommendation servers, such as server 114(1), 114(2), . . . , 114(S), accessible via the network(s) 104. The location and activity recommendation servers 114(1)-(S) may be configured as plural independent servers, or as a collection of servers that are configured to perform larger scale functions accessible by the network(s) 104. The location and activity recommendation servers 114 may be administered or hosted by a network service provider. The location and activity recommendation service 106 is implemented by the servers 114, which executes the location and activity recommendation application 110 to and from the computing device 102.

The location and activity recommendation application 110 constructs a model to represent relationships between locations and activities. The location and activity recommendation application 110 uses information from a variety of sources, such as global positioning system (GPS) logs, points of interest (POI) database, and accessing information from a search engine to construct matrices for the model.

The environment 100 may include a database 116, which may be stored on a separate server or the representative set of servers 114 that is accessible via the network(s) 104. The database 116 may store information generated by the location and activity recommendation application 110 and updated on a predetermined time interval.

FIGS. 2, 4-8, and 10 are flowcharts showing example processes. The processes are illustrated as a collection of blocks in logical flowcharts, which represent a sequence of operations that can be implemented in hardware, software, or a combination. For discussion purposes, the processes are described with reference to the computing environment 100 shown in FIG. 1. However, the processes may be performed using different environments and devices. Moreover, the environments and devices described herein may be used to perform different processes.

For ease of understanding, the methods are delineated as separate steps represented as independent blocks in the figures. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible for one or more of the provided steps to be omitted.

Figure 2:
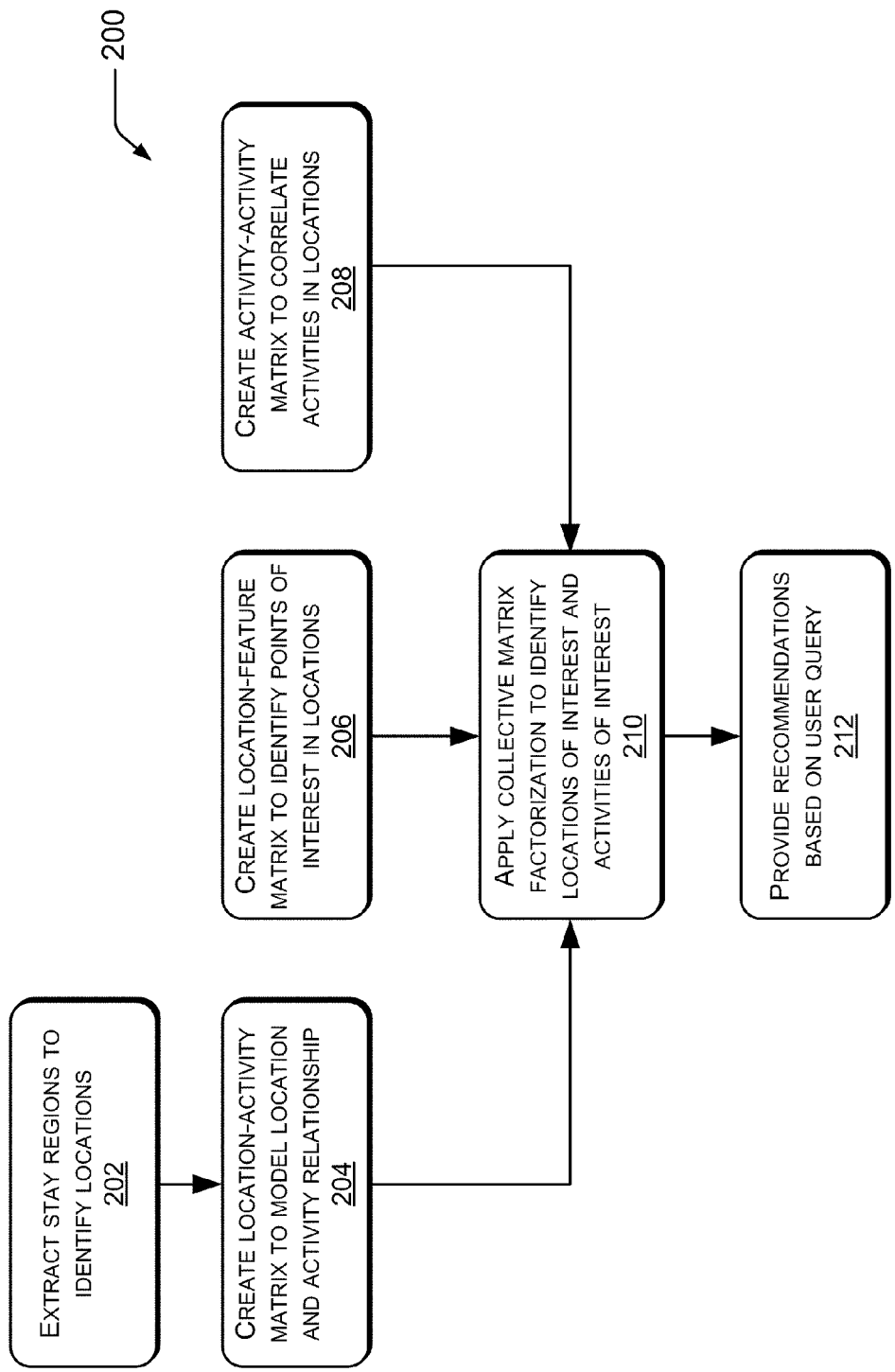
FIG. 2 illustrates an example process for recommending a location and/or an activity to a user. This process may include extracting stay regions, creating a model with a number of matrices (e.g., three), applying a collective matrix factorization, and providing recommendations.

FIG. 2 is a flowchart showing an example process 200 showing high level functions performed by the location and activity recommendation service 106. The process 200 may be divided into six phases, an initial phase to extract stay regions to identify locations 202, a second phase to create a location-activity matrix to model location and activity relationship 204, a third phase to create a location-feature matrix to identify points of interest in locations 206, a fourth phase to create an activity-activity matrix to correlate activities in locations 208, a fifth phase to apply a collective matrix factorization to identify locations of interest and activities of interest 210, and a sixth phase to provide recommendations based on a user query 212. Phases 1 to 4 are used to construct a location and activity recommendation model. All of the phases may be used in the environment of FIG. 1, may be performed separately or in combination, and without any particular order.

The first phase is to extract stay regions to identify locations 202. The location and activity recommendation service 106 collects GPS logs or other indications of geographical locations of individual users. The location and activity recommendation service 106 transforms the raw GPS data into stay regions and identifies stay regions pertaining to locations on maps. Stay regions contain a series of set points, each of which represents a geographical region where a device associated with an individual has stayed over a time threshold within a distance threshold. For instance, a stay region may include a series of three stay points, each within a certain distance from one another and collectively at which the user stayed for more than a predetermined time threshold (e.g., one hour, two hours, one day, etc.).

The second phase is to create the location-activity matrix to model the location and activity relationship 204. The location and activity recommendation service 106 models the user's location histories and activities in the locations, based on user comments corresponding to the locations.

The third phase is to create a location-feature matrix to identify points of interest in locations 206. The location and activity recommendation service 106 uses a point of interest (POI) category database to identify correlations between locations and features. The features are referred to as points of interest in the locations, such as restaurants, malls, theaters, museums, parks, and the like. Furthermore, the POI category database may also provide a frequency of occurring POI in an area, such as a number of restaurants in the location.

The fourth phase is to create the activity-activity matrix to correlate activities in locations to identify locations of interest and activities of interest 208. The location and activity recommendation service 106 gathers statistics about activities that occurred and are likely to occur in the locations. For example, when an individual goes to an event in a theater, a corresponding activity is to dine at a restaurant in similar location, before or after the theater event.

The fifth phase is to apply the collective matrix factorization 210. The location and activity recommendation service 106 fills in information in the location-activity matrix from the location-feature matrix and the activity-activity matrix.

The sixth phase is to provide recommendations based on the user query 212. The location and activity recommendation service 106 may be accessed by the user 108 for recommendations of locations and/or activities, depending on the user query. For example, as shown in FIG. 1, the user 108 submits a request for a location on the UI 112. In return, the UI 112 provides recommendations by displaying a list of activities for the location, such as Dinning, Entertainment, and Tourism/Amusement. Details of the phases are discussed in FIGS. 3-12 below.

Extracting Stay Regions from GPS Data

Figure 3:
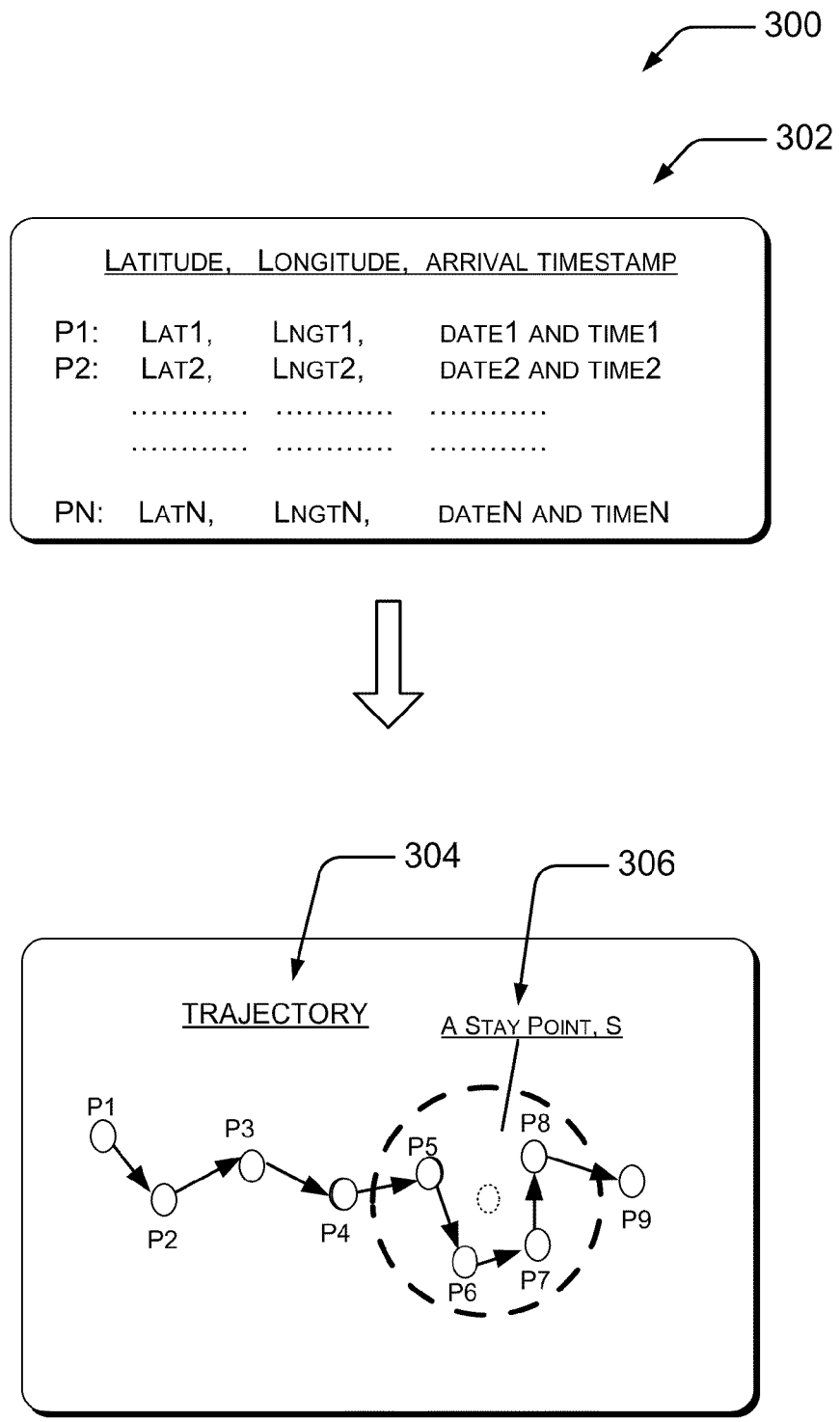
FIG. 3 illustrates an example GPS trajectory and a stay point defined thereby.

FIG. 3 illustrates examples of raw GPS data 300 that will be transformed to identify individual user's location history with time-stamped locations. The location and activity recommendation service 106 obtains, collects, or receives GPS logs 302 of geographical locations of individual users. The logs 302 may be obtained from GPS sensors, tracking units, mobile phones, or any other device, as long as these devices are located in close proximity to each of the individuals. The GPS devices may be set to automatically track the position of the GPS device at regular intervals. Each of the individual users is asked prior to tracking or sharing their movements and locations if their GPS data may be included as a part of a GPS data collection. The options are that the individual user may choose to opt-in to participate or to opt-out to not participate in their tracking or sharing of GPS data. As such, the tracking of the GPS data may require explicit user consent.

In another implementation, the location and activity recommendation service 106 may obtain GPS logs from GPS-log driven applications, social networks, or services on the web. Each individual user may be equipped with a GPS device for tracking data. The device may include a GPS navigation device, a GPS phone, or any other type of GPS sensor that collects GPS log data at a high sampling rate, such as every two to eight seconds per point. The GPS data may be uploaded to the web by the users to show their positions and to share their experiences by agreeing to opt-in to participate.

As shown in FIG. 3, the location and activity recommendation service 106 receives a GPS log 302, which is generally a collection of a set of points represented by $P=\{p_1, p_2, \ldots, p_n\}$. Each GPS point $p_i \in P$ contains a latitude ($p_i$.Lat), a longitude ($p_i$.Lngt) and a timestamp ($p_i$.T) values, such as a date and a time.

The location and activity recommendation service 106 uses a sequence of the time-stamped points from the GPS logs, which is the individual user's trajectory 304. The trajectory 304 may be represented by $Traj=(p_1, p_2, \ldots, p_9)$ and show nine GPS points.

The location and activity recommendation service 106 identifies a stay point s 306 as a geographical region, representing the region where a device associated with the individual user has stayed over a time threshold ($T_r$) within a distance threshold ($D_r$). The geographical distance between two points $p_i$ and $p_j$ is represented as $Dist(p_i, p_j)$ and the time interval as $Int(p_i, p_j)=|p_i.t_i-p_j.t_j|$.

In an implementation, the location and activity recommendation service 106 may represent the individual user's trajectory by the stay point s, which is characterized by a set of consecutive points $P=<p_m, p_{m+1}, \ldots, p_n>$, where $\forall m<i\leq n$, $Dist(p_m, p_i)\leq D_r$, $Dist(p_m,p_{n+1})>D_r$, and $Int(p_m,p_n)\geq T_r$.

Thus, the stay point $s=(x, y, t_a, t_l)$, may be represented by:

$$s.x=\Sigma_{i=m}^{n}p_i.x/|P|, s.y=\Sigma_{i=m}^{n}p_i.y/|P|w$$

which respectively stands for an average x coordinate and an average y coordinate of the collection P. The individual user's arrival time for the stay point, s is represented by $s.t_a=p_m.t_m$, and the individual user's departure time is represented by $s.t_l=P_n.t_n$.

The location and activity recommendation service 106 transforms the raw data from the GPS logs into stay points, which become stay regions that may be readily used to represent locations. In building the location-activity matrix, the process extracts a stay point 306 from the trajectory 304 of each individual user. Each stay point 306 provides semantic meaning to the raw point in the trajectory 304. For example, the stay point 306 may indicate a store, a restaurant, a theater, and the like. For example, this type of stay point may occur when the individual user enters a building, causing the satellite signal to be lost. Once the individual returns outdoors, the satellite signal is detected again. Thus, stay point 306 is considered a geographical region (in this case, the location where the signal was lost and regained) to be used in the collection of GPS data.

In an implementation, the location and activity recommendation service 106 clusters the stay points of the individual users and filters these stay points. The filtering removes the top two clusters having the greatest number of stay points, from the clustering results of the individual user. The filtering protects the individual user's privacy, such as removing their home and workplace from the cluster of stay points. Then, the stay points are reclustered after the removal.

The geographic region containing a set of stay points is a stay region. The stay points are extracted from the GPS data as $S=\{s_1, s_2, \ldots, s_N\}$ and a clustering algorithm Alg (S) takes S as input. The set of stay points make up the stay region r. The stay region r contains the set of stay points, $S'=\{s'_m, s'_{m+1}, \ldots, s'_n | s'_i \epsilon S, \forall m \leq i \leq n\}$ belonging to a cluster. The stay region $r=(x,y)$, where $r.x=\Sigma_{i=m}^{n} s_i.x/|S'|$, stand for an average x coordinate and an average y coordinate of the collection S. Thus, the stay regions are used as the basic units for location recommendations.

Figure 4:
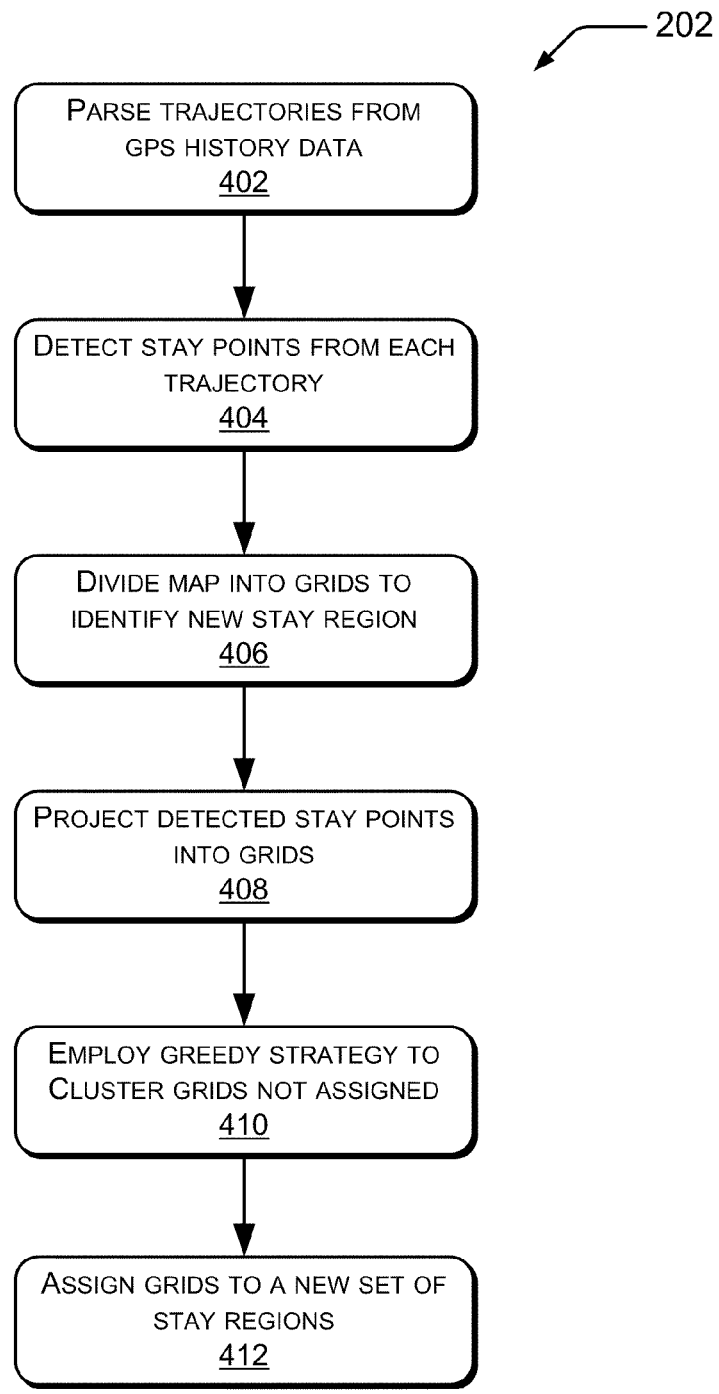
FIG. 4 illustrates an example process of extracting a set of stay regions from a collection of GPS trajectories.

FIG. 4 illustrates an example process for the phase 202 (discussed at a high level above) of extracting stay regions from GPS logs 302 using a grid-based clustering algorithm. The location and activity recommendation service 106 uses the algorithm with the collection of GPS trajectories as input, by identifying a set of users as $U=\{U_k, 1 \leq k \leq |U|\}$. For each user, $u_k \epsilon U$, the location and activity recommendation service 106 parses GPS trajectories ($Traj^k$) from their GPS history data 402. As mentioned previously, the users have agreed to opt-in to provide their GPS data.

Next, the location and activity recommendation service 106 detects the stay points ($S^k$) from each trajectory 404 to seek some spatial regions where $u_k$ spent a period over a certain threshold $T_{thresh}$ and the distance between any two consecutive GPS points in it is less than $D_{thresh}$. Using the algorithm, the set of stay points is identified as $SP=\{S^k, 1 \leq k \leq |U|\}$ where each $S^k=\{s_1, s_2, \ldots, s_N\}$ is the stay point set for user $u_k$.

Next, the location and activity recommendation service 106 divides a map into grids 406 to constrain the output stay region to be limited to a certain area size. By constraining the stay region to a certain area size, this is more convenient for the user 108 in finding the location. The grid is set as a square with a width of d/3, where d is a parameter to constrain the output stay region size, no larger than d×d. After dividing the map into grids, the location and activity recommendation service 106 projects the detected stay points into these grids 408. Thus, a set of grids is represented by $G=\{g_i, 1 \leq i \leq |G|\}$ with each $g_i \epsilon G$ has its stay point set represented as $g_i.sp$.

The location and activity recommendation service 106 employs a greedy strategy to cluster the grids 410 that contain the stay points. The location and activity recommendation service 106 finds a grid $g_i$ that has not been assigned to any stay region and has predetermined number of stay points or a maximal number of stay points $|g_i.sp|$. In an implementation, the grid may be a square shape with 3×3 grids with $g_i$ in the center. The location and activity recommendation service 106 may extract eight neighboring grids from the 3×3 grids. The grids that are not assigned among the eight neighboring grids, are denoted as ng, are clustered with $g_i$ to form a new stay region $r=g_i \cup ng$. Thus, all the stay points in $g_i$ and ng are clustered into the new stay region $r=g_i \cup ng$. Thus, there may be 3×3 grids clustered to a stay region, to constrain the extracted stay region size as d×d. The location and activity recommendation service 106 may calculate centroids of the stay points' latitude and longitude coordinates in r as r's coordinates. The location and activity recommendation service 106 provides an output of a set of stay regions 412, represented by R.

The grid-based clustering algorithm to extract a set of stay regions is shown below:

Algorithm ExtractStay Region ($D_{thresh}$, $T_{thresh}$, d)

Input: A collection of GPS trajectories $\phi = \{Traj^k, 1 \leq k \leq |U|\}$.
Output: A set of stay regions $R = \{r_i, 1 \leq i \leq m\}$, where $m = |R|$.
1. For each $u_k \in U$ do
2.     $S^k$ = StayPointDetection($Traj^k$, $D_{thresh}$, $T_{thresh}$);
3.     SP.Add($S^k$);     //the collection of stay points
4. G = GridDivision(d);     //divide the map into grids
5. For each $g_i \in G$ do
6.     $g_i.sp = \{s_k | s_k \in SP$ within the regions of $g_i\}$;
7. For all $s_k \in SP$, set $s_k.regionID = -1$;     //initialization
8. While (exists $s_k$ E SP, set $s_k.regionID = -1$) do
9.     Find $g_i$ with max $|g_i.sp|$ and unassigned to any stay region.
10.     ng = GetNeighborhoodGrids($g_i$, G); // ng is a set of grids
11.     $r = g_i \cup ng$;     // assign $g_i$ and ng to a new stay region
12.     (r.lat,r.lng) = GetCentroidCoordinates(SP, r);
13.     R.Add(r);
14.     For each $S_j \in g_i.sp$ where $g_i \in r$ do
15.         $S_j.regionID = |R|$;     // assign region ID
16. Return R;

Creating the Location-Activity Matrix

Figure 5:
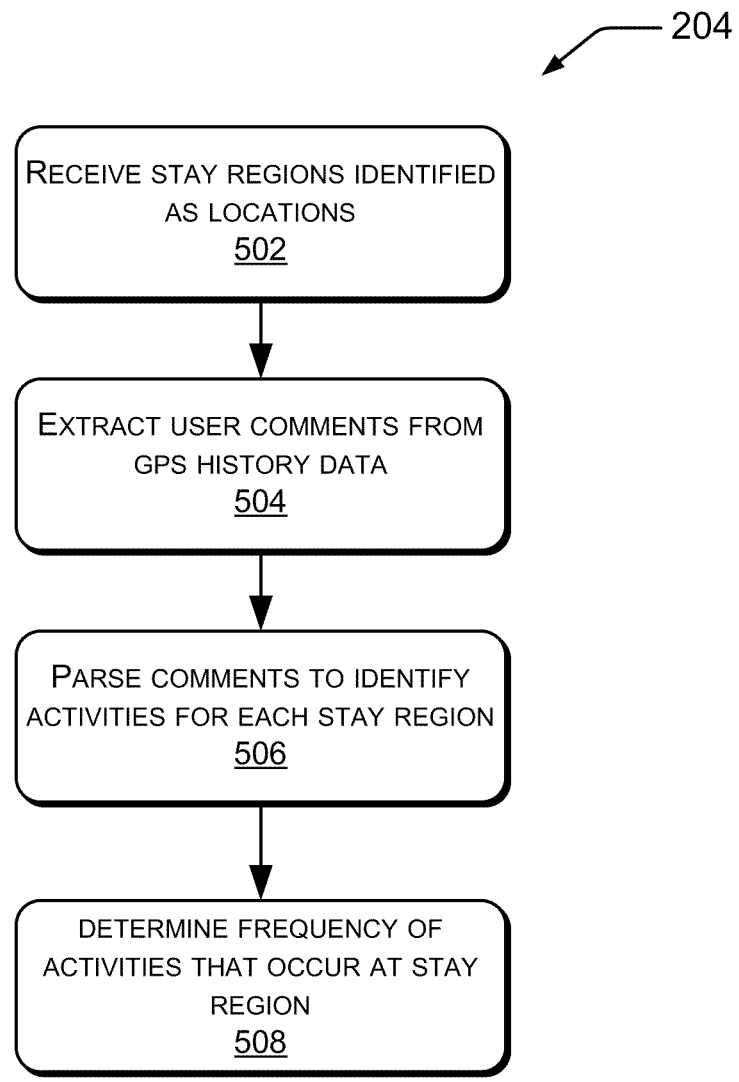
FIG. 5 illustrates an example process of creating a location-activity matrix as part of the model.

FIG. 5 is a flowchart showing an example process for phase 204 (discussed at a high level above) to create the location-activity matrix. The three matrices are part of the location and activity recommendation model, which identifies relationships between locations and activities.

As mentioned, there may be comments provided by individual users that are associated with the GPS trajectories. While the comments may be minimal, it may be possible to analyze statistically what kinds of activities are associated with the locations and how often the individuals conducted or pursued the activities in these locations. The data for the location-activity matrix may be organized with locations as rows and activities as columns. An entry in the location-activity matrix indicates a frequency for the individual users to pursue some types of activities in locations.

The location and activity recommendation service 106 obtains or receives the stay regions 502 that were extracted from the GPS logs in FIG. 4. Recall that the locations are represented in the stay region set as $R=\{r_i, 1 \leq i \leq m\}$, where the process 204 extracts the user comments from the GPS history data 504 that is attached to each stay region $r_i$. User comments may include but is not limited to ratings, favorable or unfavorable comments, insights, price, service, conditions, and the like.

The location and activity recommendation service 106 parses the text comments to identify activities pertaining to each stay region 506. For example, the individual user may have added the comment, "delicious" or "restaurant" and, if so, then it is generally assumed that the individual user had dined at a restaurant at this location. The activity may be identified as "Food and Drink" or "Dining" at this location. The location and activity recommendation service 106 parses all of the comments to determine a frequency or to obtain a count of a number of times that activities occurred at each stay region (location) 508. In particular, for a location i, there may be a n-dimensional count vector $c_i = [c_{i1}, c_{i2}, \ldots, c_{in}]$ for n activities, where each $c_{ij}$ is the number of times when activity j occurred, was pursued, or performed at location i according to the comments.

The location-activity matrix may be represented by $X_{m \times n}$, defining the entries as: $X_{ij} = c_{ij}; \forall_i = 1, \ldots, m; j = 1, \ldots, n$. While some locations may not have any comments associated with them, the count vectors may be zero vectors and the corresponding entries in the location-activity matrix may be zeros. When $X_{ij} = 0$, it is not indicative that there is no possibility of activity j occurring at location i. Rather, the zero is representative of no comments for activities that occurred in the locations. Thus, the entries that show zero represent missing values for predictions of activities.

Creating the Location-Feature Matrix

Figure 6:
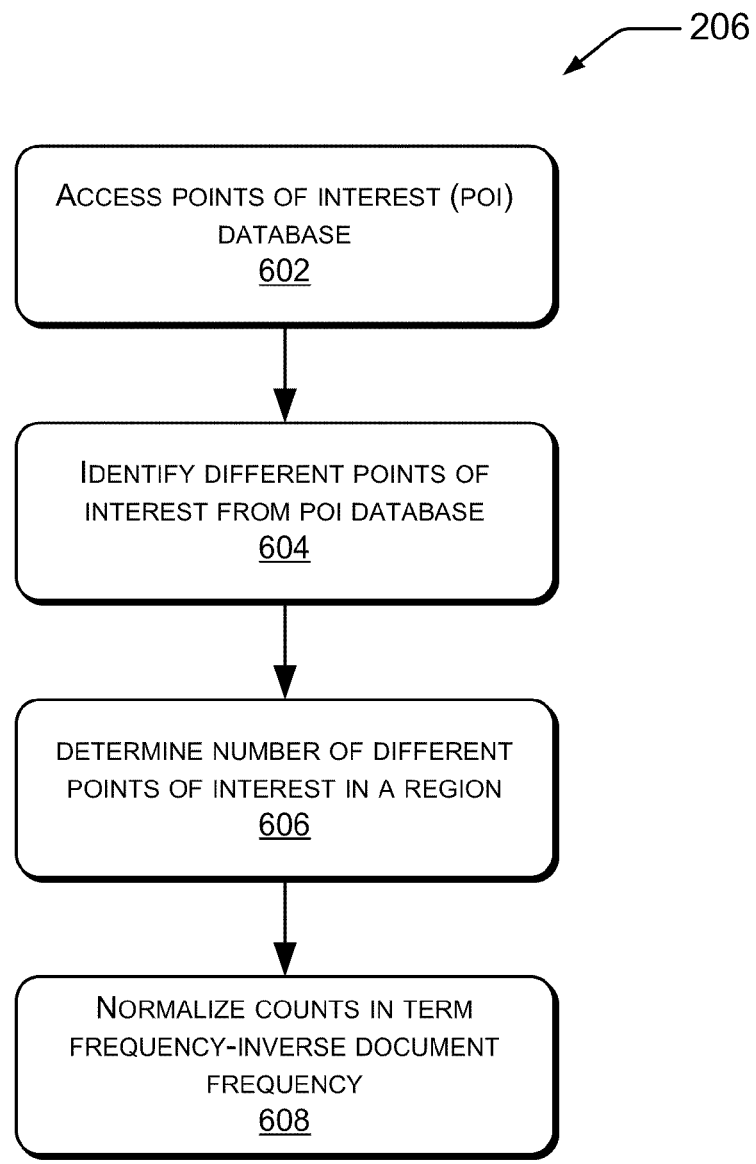
FIG. 6 illustrates an example process of creating a location-feature matrix as part of the model.

FIG. 6 illustrates a flowchart showing an example process for phase 206 (discussed at a high level above) for creating the location-feature matrix. The location and activity recommendation service 106 accesses the POI category database 602, which may be based on telephone directory data to provide content about the categories, varieties, types, or kinds of POI located in certain areas. The location and activity recommendation service 106 may send a query with a location area to the POI database, which may return results with a number of different POI that exist in the various areas. Thus, the location and activity recommendation service 106 may identify different POI based on the query to the POI database 604. For example, the results provide a location's functionalities to use them as features for recommendations. The location and activity recommendation service 106 organizes the data in matrix form, with locations as rows and features as columns. The location and activity recommendation service 106 may mine features of the locations by determining a number of different POI to create the location-feature matrix.

The location and activity recommendation service 106 may analyze the data statistically of the different POI in an interested region. In particular, using information of the stay region $r_i \in, 1 \leq i \leq m$, the location and activity recommendation service 106 may count the number of different POI 606 in an enclosing rectangle of the stay points in $r_i$ with coordinates as $[r_i.\text{lat}-d/2, r_i.\text{lat}+d/2] \times [r_i.\text{lng}-d/2, r_i.\text{lng}+d/2]$. The size parameter, d was previously discussed, which is used to constrain the size of the output stay region. Thus, the size of the enclosing rectangle is d×d. The count vector for the location i is $q_i=[q_{i1}, q_{i2}, \ldots, q_{il}]$ for l types of POI.

The location and activity recommendation service 106 may group the locations according to business categories or business categories based on addresses. Restaurants are classified under the food category while museums and theatres are classified under entertainment. There are some business categories that occur more frequently than others, such as there are more restaurants than theaters. The location and activity recommendation service 106 follows the information retrieval by further normalizing counts by a term frequency-inverse document frequency (TF-IDF) 608 to obtain the location-feature matrix. The TF-IDF is a way of statistically analyzing how important a word is to a document in a collection. A weight evaluates the importance of the word. The word may increase in proportion to a number of times the word appears in the document, while the frequency of the word in the collection offsets the increase. For example, the TF identifies how important is the category and the IDF identifies how important is the category to the location.

The location-feature matrix may be represented as $Y_{m \times l}$. The entry of Y is represented as:

$$Y_{ij} = \frac{q_{ij}}{\sum_{j=1}^{l} q_{ij}} \cdot \log \frac{|\{q_i\}|}{|\{q_i; q_{ij} > 0\}|},$$

$\forall_i = 1, \ldots, m; j=1, \ldots, l$.

where $|\{q_i\}|$ is a number of all of the count vectors (i.e., a number of locations), and $|\{q_i; q_{ij} \neq 0\}|$ is the number of count vectors (i.e., locations) having non-zero j-th type POI. The location and activity recommendation service 106 may increase the weights for the POI that occur less often but are more unique, including but not limited to theaters, tourist attractions, and decrease the weights for the locations that occur more frequently or extensively distributed, including but not limited to restaurants, shops, and bars.

Creating the Activity-Activity Matrix

Figure 7:
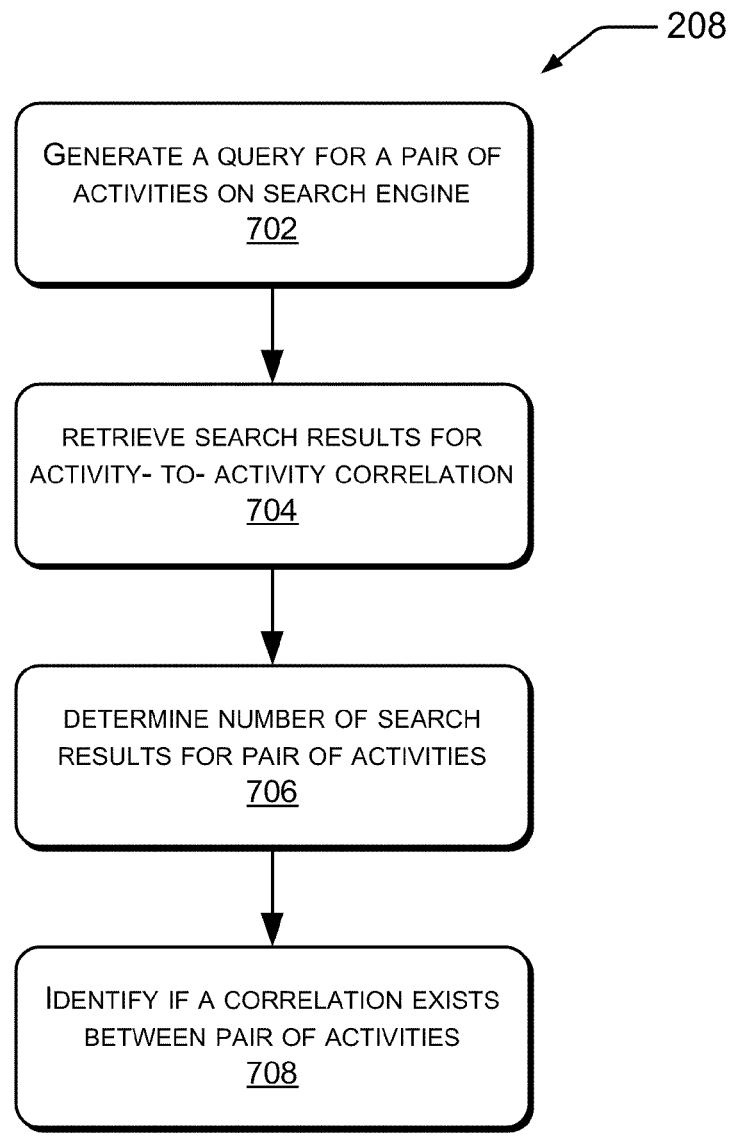
FIG. 7 illustrates an example process of creating an activity-activity matrix as part of the model.

FIG. 7 illustrates a flowchart showing an example process for phase 208 (discussed at a high level above) for creating the activity-activity matrix. The location and activity recommendation service 106 correlates activities to infer that if a first activity occurred in the location, then it is likely that another corresponding second activity will occur in the same location. For example, going to a show in a theater may indicate the corresponding activity of going out to dinner at a restaurant in the same (e.g., nearby) location, either before or after the theater.

The location and activity recommendation service 106 accesses Internet to generate a query for a pair of activities on a search engine 702. Each of the pair of activities may be represented as $a_i$ and $a_j$. The name of the activities may be submitted to the search engine to retrieve search results 704. In response, a list of Web pages are returned that describe the two activities together.

The location and activity recommendation service 106 determines the number of Web pages returned for the pair of activities 706. By counting the number of Web pages returned for the pair of activities, the process 208 determines that a correlation may exist between the pair of activities 708. In another implementation, the process 208 determines the number of search results returned and compares this number to a threshold number to determine whether the correlation exists between the pair of activities. In yet another implementation, the process 208 determines that the number of search results for the pair of activities is greater than a threshold number.

For example, two activities may be combined such as "Food and Drinks" (dinning) with "Shopping." The combined pair of activities is given as the search query to the Internet. The number of returned Web pages may be approximately 30.3 million hits. In another implementation, two other activities are combined, such as "Food and Drinks" with "Sports." The combined pair of activities is also given to the search engine. The return of the number of Web pages for this pair of activities may be approximately 7.6 million hits. Thus, the correlation of "Food and Drinks" with "Shopping" is much greater than the correlation of "Food and Drinks" with "Sports."

By performing these acts, the location and activity recommendation service 106 builds the activity-activity matrix which may be represented as $Z_{n \times n}$ with each entry defined as $Z_{ij}=h_{ij}/h^*$, $\forall_i=1, \ldots, n; j=1, \ldots, n$, where $h_{ij}$ is a number of Web page hit counts for activity i and activity j based on the search engine, $h^*=\text{argmax } h_{ij}$, the maximal hit counts is represented by $\forall_i, j$, among all of the hit counts for each pair of activities.

Applying the Collective Matrix Factorization

Figure 8:
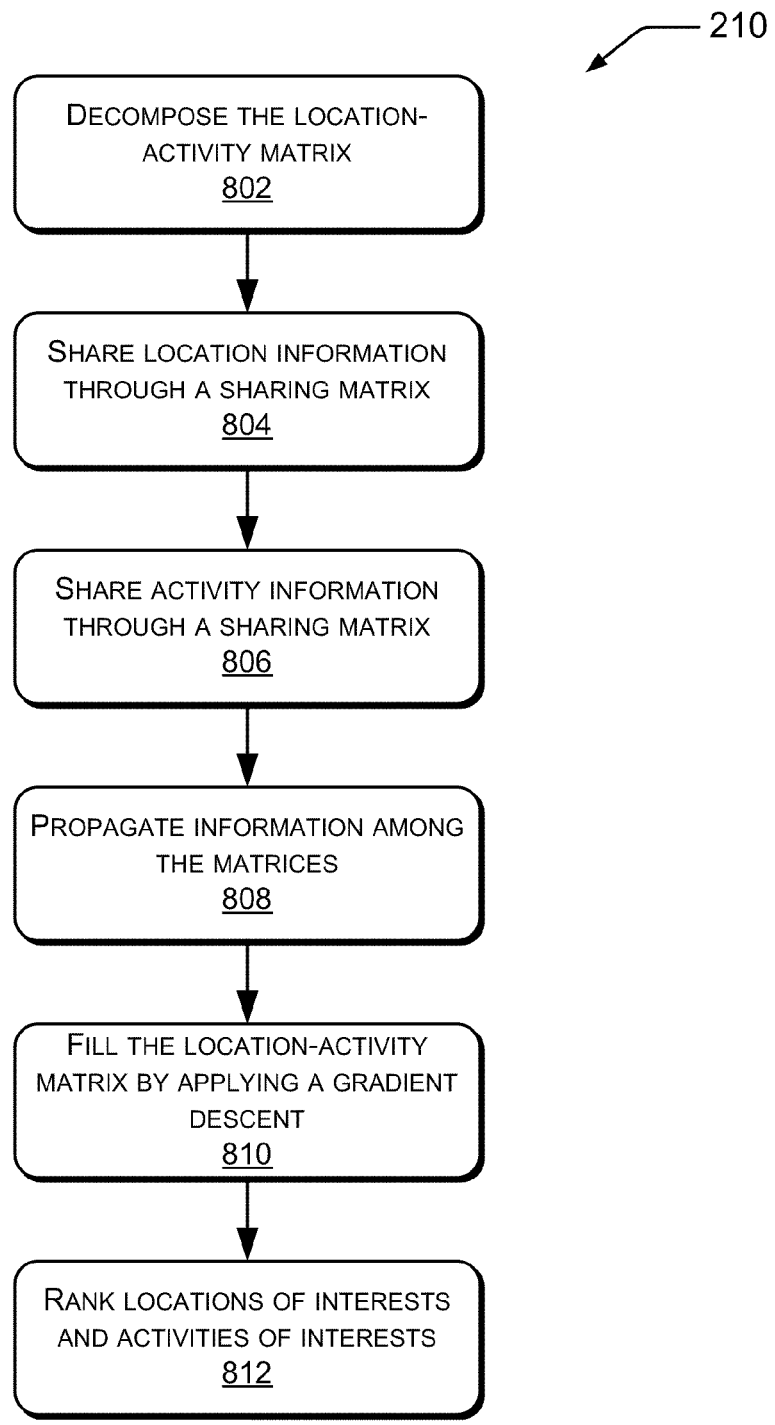
FIG. 8 illustrates an example process of applying a collective matrix factorization and ranking locations and activities in a completed location-activity matrix.

FIG. 8 illustrates a flowchart for an example process for phase 210 (discussed at a high level above) for applying the collective matrix factorization to the three matrices discussed above. The location and activity recommendation service 106 fills in missing entries in the location-activity matrix by receiving shared information from the location-feature matrix and the activity-activity matrix. A filled location-activity matrix helps identify locations and activities to provide recommendations to the user 108.

The location and activity recommendation service 106 decomposes the location-activity matrix $X_{m \times n}$ 802 by a low-rank approximation, resulting in a product of two matrices identified as $U_{m \times k}$ and $V_{n \times k}$ (the superscript "T" for $V_{n \times k}^T$ denotes the matrix transpose), where k<n.

The location and activity recommendation service 106 shares location information with the location-activity matrix through a first sharing matrix $U_{m \times k}$ 804 with the location-feature matrix $Y_{m \times l}$. This is decomposed as a product of matrices $U_{m \times k}$ and $W_{l \times k}$.

The location and activity recommendation service 106 also shares activity information with the location-activity matrix through a second sharing matrix $V_{n \times k}$ 806 with the activity-activity matrix $Z_{n \times n}$, which is decomposed as a self product of $V_{n \times k}$.

The location and activity recommendation service 106 applies the collective matrix factorization by propagating information among the location-activity matrix, the location-feature matrix, and the activity-activity matrix 808. A collective matrix factorization model may be used to help fill the missing entries in the location-activity matrix. The collective matrix factorization model is represented by an objective function as:

$$L(U, V, W) = \frac{1}{2}\|I \circ (X - UV^T)\|_F^2 + \frac{\lambda_1}{2}\|Y - UW^T\|_F^2 + \frac{\lambda_2}{2}\|Z - VV^T\|_F^2 + \frac{\lambda_3}{2}(\|U\|_F^2 + \|V\|_F^2 + \|W\|_F^2)$$

where $\|\cdot\|_F$ denotes a Frobenius norm. An indicator matrix is represented by I with an entry of $I_{ij}=0$ if $X_{ij}$ is missing, $I_{ij}=1$, otherwise. The operator "∘" denotes an entry-wise product. The first three terms in the objective function control a loss in matrix factorization, and the last term controls a regularization over the factorized matrices to prevent overfitting.

The objective function may not be jointly convex to all of the variables, $U_{m \times k}$, $V_{n \times k}$ and $W_{l \times k}$. It may not be possible to get closed-form solutions for minimizing the objective function. Therefore, the location and activity recommendation service 106 uses a numerical method, such as gradient descent to find the local optimal solutions. Gradient descent is a method of steepest descent using a first-order optimization algorithm. The algorithm may take steps that are proportional to a negative of a gradient of a function at a current point to find a local minimum of the function.

The gradients are denoted as $\nabla$ and each variable may be represented as:

$\nabla_U L = [I \circ (UV^T - X)]V + \lambda_1(UW^T - Y)W + \lambda_3 U$ $\nabla_V L = [I \circ (UV^T - X)]^T U + 2\lambda_2(VV^T - Z)V + \lambda_3 V$ $\nabla_W L = \lambda_1(UW^T - Y)^T U + \lambda_3 W$ After having the gradients, the location and activity recommendation service 106 applies a gradient descent 810 to iteratively minimize associating the information to the location-activity matrix.

The algorithm for achieving local optimal solutions is shown below:

---
Algorithm Collaborative Location and Activity Recommendation

Input: Incomplete location-activity matrix $X_{m \times n}$, location-feature matrix $Y_{m \times l}$ and activity-activity matrix $Z_{n \times n}$.
Output: Complete location-activity matrix $X_{m \times n}$.
1. t = 1;
2. While (t < T and $L_t - L_{t+1} \geq \epsilon$) do   //T is #(max iterations)
3.   Get the gradients $\nabla_{U_t}, \nabla_{V_t}$ and $\nabla_{W_t}$ from objective function;

---
Algorithm Collaborative Location and Activity Recommendation

4. $\gamma = 1$;
5. While $(L(U_t - \gamma\nabla_{U_t}, V_t - \gamma\nabla_{V_t}, W_t - \gamma\nabla_{W_t}) \geq L(U_t, V_t, W_t))$ do
6.   $\gamma = \gamma/2$;   // search for the maximal step size
7.   $U_{t+1} = U_t - \gamma\nabla_{U_t}, V_{t+1} = V_t - \gamma\nabla_{V_t}$ and $W_{t+1} = W_t - \gamma\nabla_{W_t}$;
8.   t = t + 1;
9. Return X;

---

As shown above, the location-activity matrix $X_{m \times n}$ has been filled or completed with entries for locations and activities. A user query of some location may be entered by the user 108. The location and activity recommendation service 106 looks for the information in the filled location-activity matrix, particularly in the rows of $X_{m \times n}$, which contain locations. If the queried location exists in the filled location-activity matrix (i.e., the location coordinates pertain to some stay region in the matrix of the application), a row of $X_{m \times n}$ is identified, such as i-th row. The location and activity recommendation service 106 ranks the i-th row's values in a descending order and returns a list of corresponding activities for activity recommendations.

In an implementation, a location query is entered for "Bird's Nest" which is evaluated against the locations in the filled location-activity matrix. The queried location, "Bird's Nest" is matched with the $10^{th}$ row (i.e., $10^{th}$ location) of the filled location-activity matrix $X_{m \times n}$. The location and activity recommendation service 106 may extract the $10^{th}$ row's ratings, e.g., x=[2, 3, 4, 5, 1], where each entry denotes the rating for an activity. The ratings [2, 3, 4, 5, 1] may pertain to Food, Shopping, Sports, Tourism, and Movies, respectively. The location and activity recommendation service 106 may recommend a list of activities based on the ratings of [1, 2, 3, 4, 5] in a descending order of Movies, Food, Shopping, Sports, and Tourism, respectively.

For a user query of some activity, the location and activity recommendation service 106 looks up the information in the filled location-activity matrix, particularly in the columns of $X_{n \times n}$. If the activity is found and matched in the filled location-activity matrix, a column of $X_{m \times n}$ is identified, such as j-th column of $X_{m \times n}$. The location and activity recommendation service 106 ranks the j-th column's values in a descending order and returns a list of top number, N of corresponding locations for candidate location recommendations. The location and activity recommendation service 106 ranks the locations of interest and the activities of interest 812, based on the user query.

Figure 9:
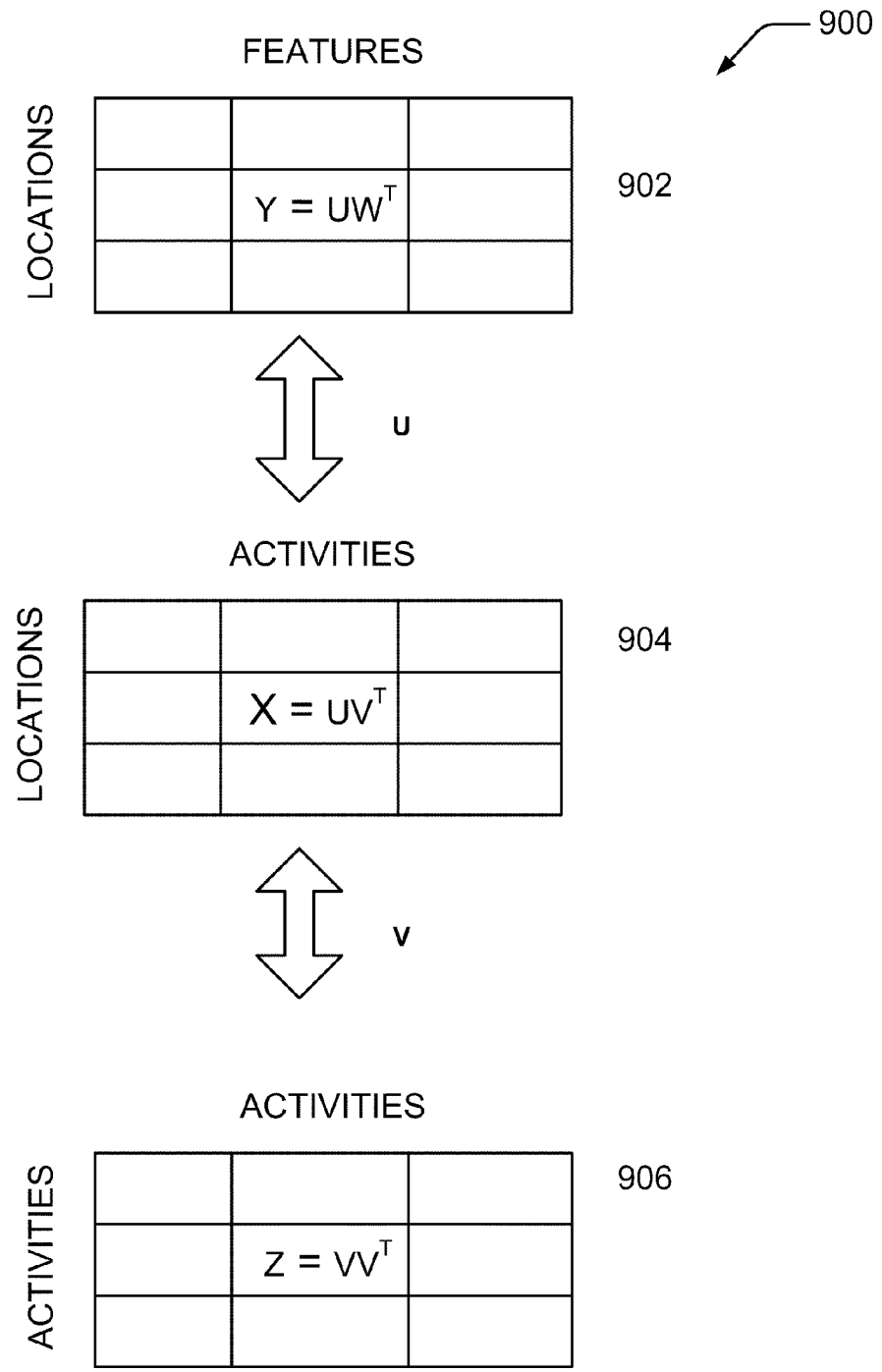
FIG. 9 illustrates an example process of collective matrix factorization on the three matrices

FIG. 9 illustrates an example collective matrix factorization 900 on example matrices. The matrices may be much larger in size but shown herein for illustrative purposes with a few rows and a few columns. The location and activity recommendation service 106 propagates the information among the location-feature matrix 902 represented by $Y_{m \times l}$, the location-activity matrix 904 represented by $X_{m \times n}$, and the activity-activity matrix 906 represented by $Z_{n \times n}$. The location and activity recommendation service 106 specifies the three matrices to share low-rank matrices $U_{m \times k}$ and $V_{n \times k}$ as described in FIG. 8. As a result of the sharing of information and the superscript "T" denoting the matrix transpose, the matrix transposes shown are $Y=UW^T$ in 902, $X=UV^T$ in 904, and $Z=VV^T$ in 906.

Providing Recommendations

Figure 10:
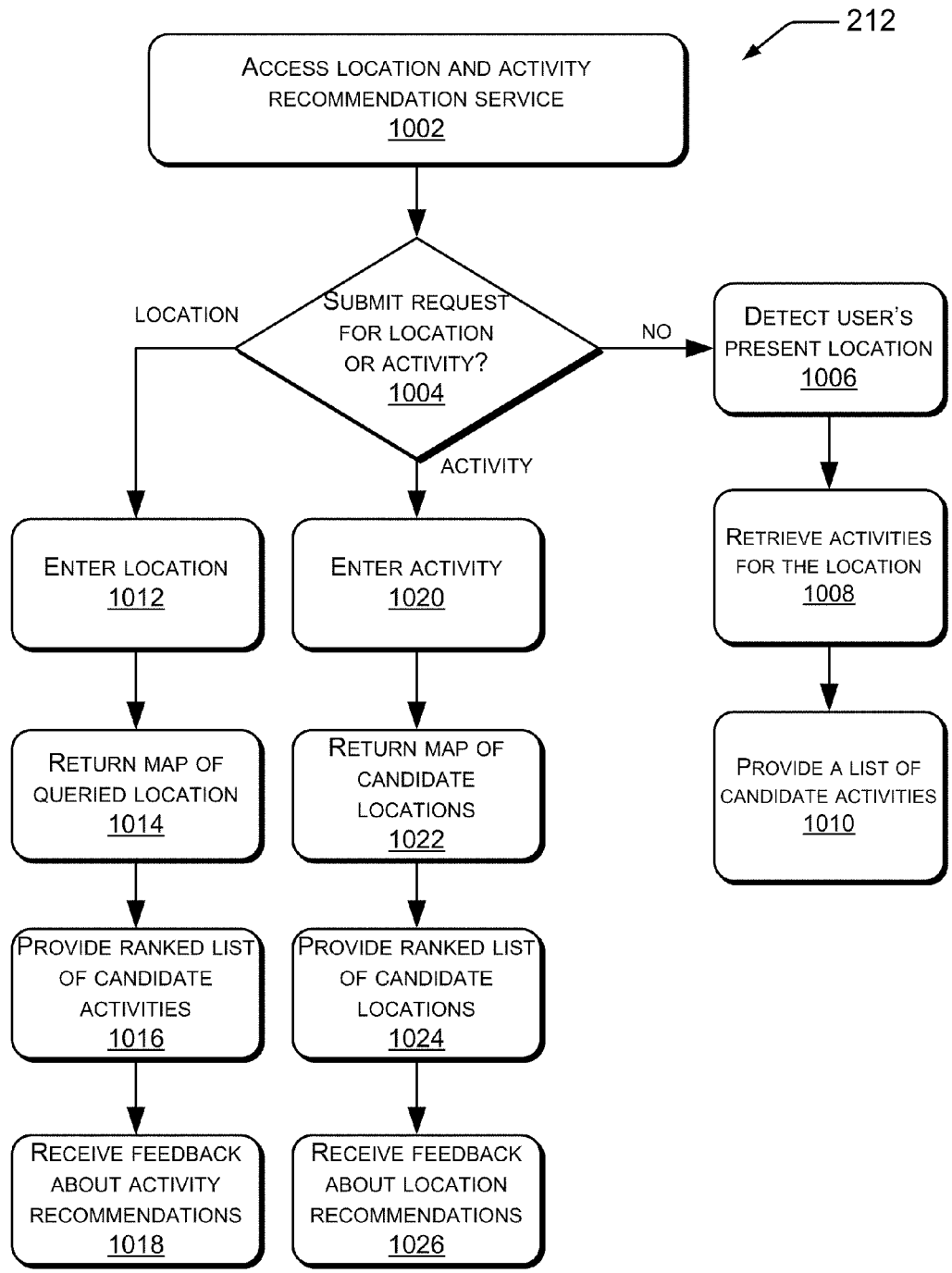
FIG. 10 illustrates an example process of providing recommendations.

FIG. 10 illustrates an example process for providing recommendations 212, as discussed at a high level above. The recommendations may be for locations and/or activities depending on the user query, the user's present geographical location, and/or predictions of the user's interests in locations and/or activities. The terms locations of interest and activities of interest may be used to describe the locations and activities that are to be recommended. The location and activity recommendation service 106 is accessed 1002, which is executed by the location and activity recommendation application 110. The user 108 may provide the query for input of location and/or the query for input of activity 1004. If there is no query or input, the process moves to the right side to detect the user's present geographical location 1006. Again, this is based on the user 108 giving permission to opt-in for the location and activity recommendation service 106 to track their movements and locations. Based on the user's present geographical location, the process retrieves a map of the geographical location and of activities that have occurred in the geographical location 1008. Then the process provides a ranking list of activities for that location 1010.

In another implementation, the user 108 may enter a location query 1012. The location and activity recommendation service 106 may return a display of a map of the location queried 1014 and provide a ranked list of candidate activities 1016. Furthermore, the location and activity recommendation service 106 may receive feedback from the user 108 about the activity recommendations 1018 by submitting ratings to the location and activity recommendation application 110.

In yet another implementation, the user 108 may enter an activity query 1020. The location and activity recommendation service 106 may return a map of the candidate locations 1022 and provide a ranked list of the candidate locations 1024. Furthermore, the location and activity recommendation service 106 may receive feedback from the user 108 about the location recommendations 1026 by submitting ratings to the location and activity recommendation application 110.

Recommendations may also be provided based on predictions of the user's interests in the activities for a particular location or the user's interests in a specific location for activities. For example, the recommendations may be based on the user's search history for activities, such as searching for dinning out in specific area. The location and activity recommendation application 110 may suggest other locations with restaurants. In another implementation, the recommendations may be based on the user's search history for locations, such as "Fisherman's Wharf" in San Francisco, Calif. The location and activity recommendation application 110 may suggest activities for tourisms, dinning, and shopping at Fisherman's Wharf. The user has the opportunity to opt-in to allow the service to identify previous query searches.

Figure 11:
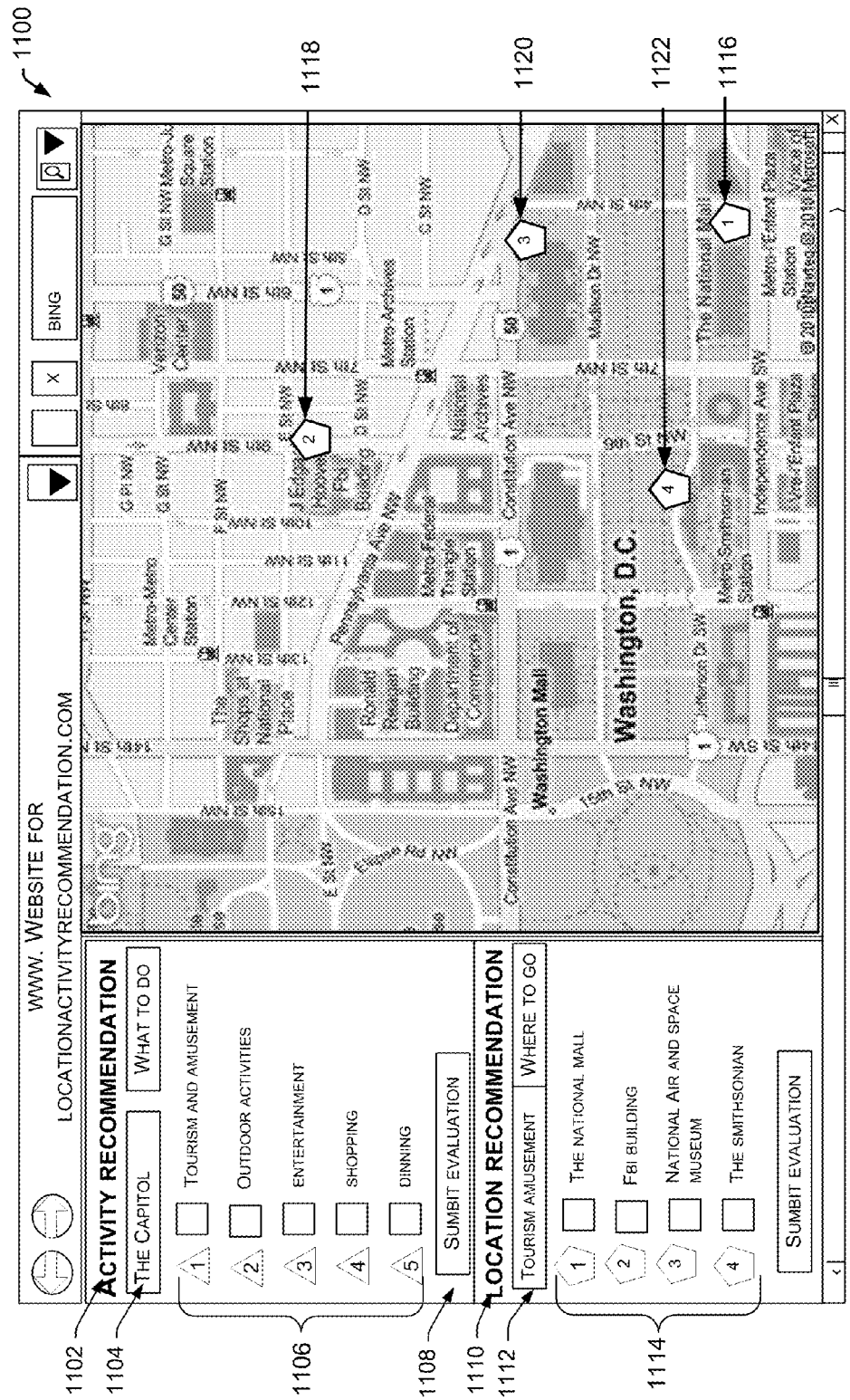
FIG. 11 illustrates an example user interface of providing recommendations.

FIG. 11 is an example user interface 1100 of the location and activity recommendation application 110. As shown along the left side of the upper half of the user interface 1100 is "Activity Recommendation" 1102 that displays a list of activities recommended based on the user query. At 1104, a user may input a query for a location, such as "The Capitol." The query may include but not limited to a name of a well known landmark, a street address, a general description identifying parks, stores, hospitals, education facilities, and the like located near a region or a street address. The location and activity recommendation service 106 returns the recommended activity list 1106, shown with five candidate activities for the location query. The five candidate activities may include but is not limited to "Tourism and Amusement," "Outdoor Activities" such as sports and exercise, "Entertainment" such as shows and movies, "Shopping," and "Dinning." The user 108 may provide feedback about the recommendations by rating the activity recommendations. The user may access "Submit Evaluation" 1108 to rate the activities for the location based on a scale of 1 to 5, with 5 being "a best" and 1 being "a worst" recommendation. The interface may additionally or alternatively employ other feedback mechanisms.

Also shown is "Location Recommendation" 1110 that displays a list of locations recommended based on the activity query. At 1112, the user 108 submits the query for the type of activity, such as "Tourism Amusement." The location and activity recommendation service 106 returns the recommended location list of candidates 1114 that may include up to 10 candidate locations, in some implementations, although any other number of candidate locations may be returned in other implementations. As shown on a map, the location and activity recommendation service 106 displays the list of recommendation locations and the recommended locations in the map, identifying the candidate locations by numbers. For example, the first recommendation "The National Mall" is shown with the number 1 at its location 1116. The other recommendations "FBI Building," "National Air and Space Museum" and "The Smithsonian" are shown with their locations 1118, 1120, and 1122, respectively. The recommendations may be used for tourism transportation services, social networking, location-based services, trip planning, daily routines, and the like.

Illustrative Server Implementation

Figure 12:
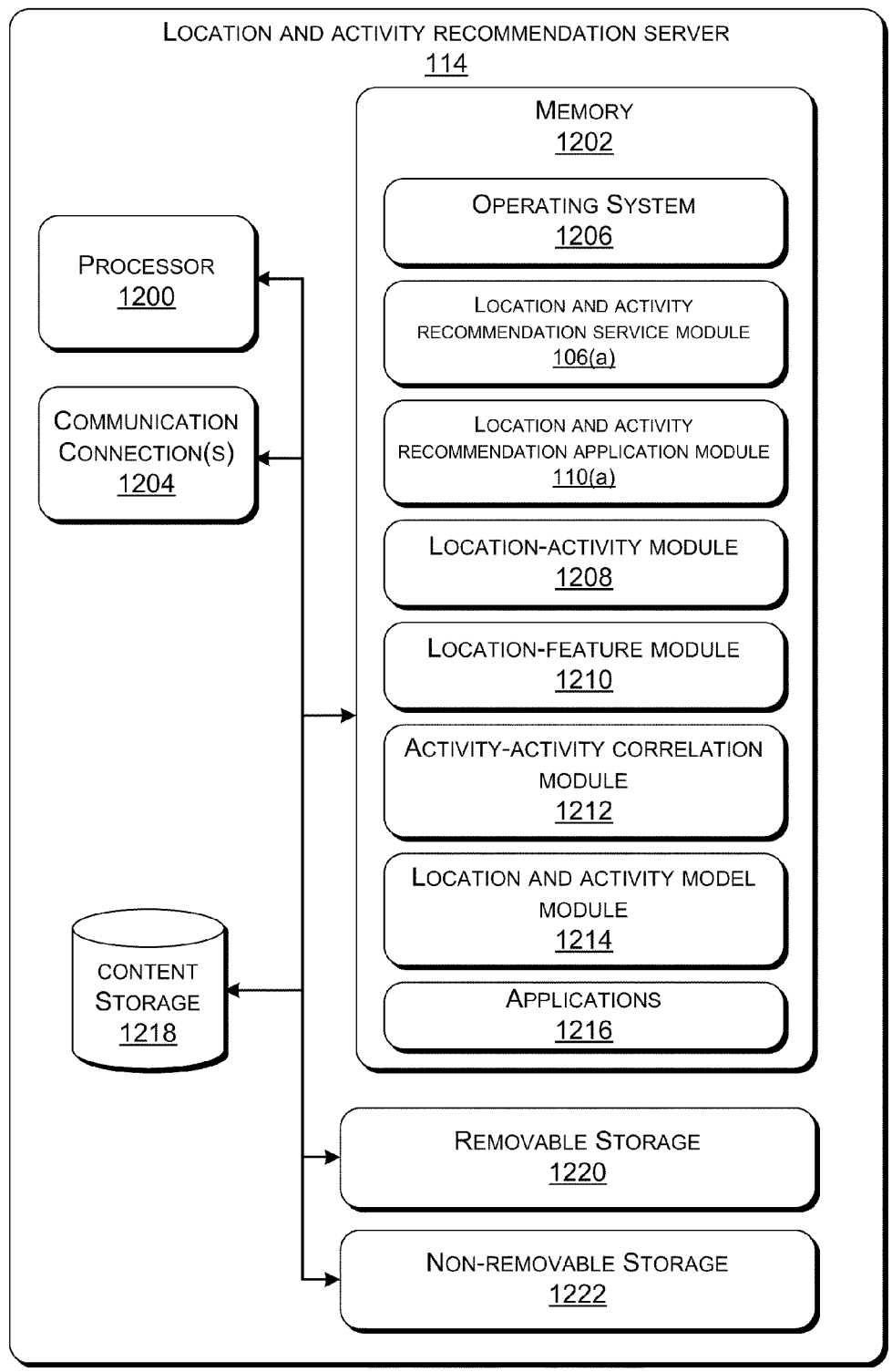
FIG. 12 is a block diagram showing an example location and activity server usable with the environment of FIG. 1.

FIG. 12 is a block diagram showing an example server usable with the environment of FIG. 1. The server 114 may be configured as any suitable system capable of services, which includes, but is not limited to, implementing the location and activity recommendation service 106 for online services, such as providing recommendations for locations and/or activities. In one example configuration, the server 114 comprises at least one processor 1200, a memory 1202, and a communication connection(s) 1204. The communication connection(s) 1204 may include access to a wide area network (WAN) module, a local area network module (e.g., WiFi), a personal area network module (e.g., Bluetooth), and/or any other suitable communication modules to allow the server 114 to communicate over the network(s) 104.

Turning to the contents of the memory 1202 in more detail, the memory 1202 may store an operating system 1206, a module for the location and activity recommendation service 106(*a*), a module for the location and activity recommendation application 110(*a*), a location-activity module 1208, a location-feature module 1210, an activity-activity module 1212, and a location and activity module 1214. Furthermore, there may be one or more applications 1216 for implementing all or a part of applications and/or services using the location and activity recommendation service 106.

The location and activity recommendation service module 106(*a*) provides access to the location and activity recommendation application 110. It also receives the user queries, sends the recommendations, builds the model and processes, ranks the list of locations and activities, interacts with the matrices, and other modules to provide recommendations.

The location and activity recommendation application module 110(*a*) interacts with the location and activity recommendation service. It provides the display of the application on the user interface, interacts with the matrices, models, and other modules to provide recommendations.

The location-activity module 1208 processes the GPS data and comments to create the location-activity matrix. The process includes collecting or receiving GPS logs, parsing trajectories from the log data, extracting stay points from the trajectories, clustering stay points of individual users, and identifying stay regions (locations). Also, the comments for the corresponding locations are parsed to associate activities with the locations.

The location-feature module 1210 identifies different points of interest in regions to create the location-feature matrix. The location-feature module 1210 applies the term-frequency inversed-document-frequency on data from POI category database.

The activity-activity module 1212 identifies correlations between activities to create the activity-activity matrix. The activity-activity module 1212 submits a pair of activities to the Internet to determine a count of the number of activities returned from the Web pages. The greater the number of returned Web pages for the pair of activities helps in identifying a correlation.

The location and activity recommendation model module 1214 extracts knowledge as inputs and uses the data from the three matrices to train a recommendation system. Furthermore, the location and activity recommendation model module 1214 applies the collective matrix factorization framework to fill in missing entries in the location-activity matrix.

The server 114 may include a content storage 1218 to store the collection of GPS logs, trajectories, stay points, clusters, data for the matrices, location and activity recommendation model, and the like. Alternatively, this information may be stored on database 116.

The server 114 may also include additional removable storage 1220 and/or non-removable storage 1222. Any memory described herein may include volatile memory (such as RAM), nonvolatile memory, removable memory, and/or non-removable memory, implemented in any method or technology for storage of information, such as computer-readable storage media, computer-readable instructions, data structures, applications, program modules, emails, and/or other content. Also, any of the processors described herein may include onboard memory in addition to or instead of the memory shown in the figures. The memory may include storage media such as, but not limited to, random access memory (RAM), read only memory (ROM), flash memory, optical storage, magnetic disk storage or other magnetic storage devices, or any other medium which can be used to store the desired information and which can be accessed by the respective systems and devices.

The server as described above may be implemented in various types of systems or networks. For example, the server may be a part of, including but is not limited to, a client-server system, a peer-to-peer computer network, a distributed network, an enterprise architecture, a local area network, a wide area network, a virtual private network, a storage area network, and the like.

Various instructions, methods, techniques, applications, and modules described herein may be implemented as computer-executable instructions that are executable by one or more computers, servers, or telecommunication devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method implemented at least partially by a processor, the method comprising:
    creating a location-activity matrix by detecting stay points to represent a set of stay regions representing stay points where a device associated with an individual has stayed over a time threshold within a distance threshold, and by extracting user comments from global positioning system (GPS) logs of the device corresponding to the set of stay regions;
    creating a location-feature matrix by identifying points of interest (POI) in a region and determining a number of different POI in an enclosing polygon of stay points;
    creating an activity-activity matrix by identifying a correlation between a pair of activities; and
    associating information from the location-feature matrix and the activity-activity matrix with the location-activity matrix.

2. The method of claim 1, wherein the creating the location-activity matrix further comprises:
    parsing the user comments from the GPS logs to identify activities for each stay region; and
    determining a frequency for the activities at each stay region.

3. The method of claim 1, wherein the creating the location-feature matrix further comprises:
    normalizing the number of the different POI by a term frequency-inverse document frequency; and
    assigning less weight for the POI that occur more frequently in the enclosing polygon of stay points.

4. The method of claim 1, wherein the activity-activity matrix further comprises:
    sending a query for the pair of activities to a search engine;
    retrieving a number of search results for the pair of activities queried on the search engine; and
    determining the number of search results returned and comparing this number to a threshold number to determine whether the correlation exists between the pair of activities.

5. The method of claim 1, further comprising:
    parsing trajectories from the GPS logs, the trajectories based at least in part on a sequence of stay points;
    dividing a map of the stay points into a set of grids based on at least a parameter;
    identifying a grid that has not been assigned to a stay region, the grid having a predetermined number of stay points;
    extracting neighboring grids that surround the grid, the neighboring grids including grids that have been assigned to stay regions and grids that have not been assigned to the stay regions; and
    clustering the grid and the neighboring grids that have not been assigned to the stay regions to form a new stay region.

6. The method of claim 1, further comprising applying a gradient descent to iteratively minimize associating the information to the location-activity matrix.

7. The method of claim 1, further comprising:
    receiving a query for a location;
    identifying and ranking activities that correspond to the location queried; and
    providing a recommendation of a list of candidate activities based at least in part on the ranking.

8. The method of claim 1, further comprising:
receiving a query for an activity;
identifying and ranking locations of interest in the location-activity matrix that correspond to the activity queried; and
presenting a list of candidate locations of interest in the location-activity matrix based at least in part on the ranking.

9. The method of claim 1, further comprising presenting a user with a recommendation for an activity of interest, the recommendation being based at least in part on a present geographical location of the user, a geographical location accessed on a map, and/or a prediction of the user's interest in the activity of interest based on a query history of the location.

10. The method of claim 1, further comprising presenting a user with a recommendation for a location of interest, the recommendation being based at least in part on a prediction of the user's interest in the location based on a query history for activities that occur in the location of interest.

11. One or more computer-readable storage media encoded with instructions that, when executed by a processor, perform acts comprising:
creating a location and activity recommendation model that models a relationship between locations and activities;
applying a collective matrix factorization to identify locations of interest and corresponding activities of interest from the location and activity recommendation model by:
decomposing a location-activity matrix by a low rank approximation as a product of sharing matrices;
sharing location information through a first sharing matrix from a location-feature matrix;
sharing activity information through a second sharing matrix from an activity-activity matrix;
propagating location and activity information among the location-activity matrix, the location-feature matrix, and the activity-activity matrix; and
filling locations of interest information and activities of interest information in the location-activity matrix by applying a gradient descent to achieve a filled location-activity matrix; and
providing to a user a recommendation for a location of interest and/or a recommendation for an activity of interest with reference to the filled location-activity matrix.

12. The computer-readable storage media of claim 11, further comprising creating the location and activity recommendation model by:
obtaining stay points from global positioning system (GPS) logs to represent locations, representing locations where a device associated with an individual has stayed over a time threshold within a distance threshold and evaluating user comments from the GPS logs to correspond to the locations to create the location-activity matrix;
parsing the user comments from GPS logs to identify activities for each stay region; and
determining a frequency for the activities that occur at each stay region.

13. The computer-readable storage media of claim 11, further comprising:
identifying points of interest (POI) in the locations; and
mining features of the locations by determining a number of different POI in the locations to create the location-feature matrix.

14. The computer-readable storage media of claim 11, further comprising:
identifying a correlation for a pair of activities to create the activity-activity matrix by:
submitting a pair of activities to a search engine;
retrieving a number of search results for the pair of activities queried on the search engine; and
determining that the number of search results for the pair of activities is greater than a threshold number.

15. The computer-readable storage media of claim 11, wherein the recommendation for the activity of interest is based at least in part on a present geographical location of the user, a geographical location accessed on a map, and/or a prediction of the user's interest in the activity of interest based at least in part on a query history of the location.

16. The computer-readable storage media of claim 11, further comprising:
ranking the locations of interest and the activities of interest in a descending order in the filled location-activity matrix;
presenting the recommendation for locations of interest based at least in part on a query of an activity, the recommendation including a list of candidate locations; or
presenting the recommendation for activities of interest based at least in part on a query of a location, the recommendation including a list of candidate activities.

17. A system comprising:
a processor;
a memory coupled to the processor;
a plurality of modules stored in the memory and executable on the processor, the plurality of modules comprising:
a location and activity recommendation model module to compute relationships between locations and activities based at least in part on information from global positioning system (GPS) logs, a points of interest (POI) database, and information accessible via a search engine;
a location-activity recommendation service module to receive user input from a user and present a recommendation for a location and/or an activity to the user at least partly in response to receiving the user input, the recommendation based at least in part on the relationships computed by the location and activity recommendation model module;
a location-activity module to extract stay points from the GPS logs, each stay point representing a geographical region where an individual has stayed over a time threshold within a distance threshold;
the location-activity module to divide a map of the geographical region into grids by employing a greedy clustering algorithm;
the location-activity module to identify a grid that has not been assigned to a stay region;
the location-activity module to extract neighboring grids that surround the grid, the neighboring grids include grids that have been assigned to stay regions and grids that have not been assigned to the stay regions; and
the location-activity module to cluster the grid and the neighboring grids that have not been assigned to the stay regions to form a new stay region.

18. The system of claim 17, the location and activity recommendation service module being further to rank the locations and activities; and
the location and activity recommendation model module being further to provide a list of at least a portion of the locations and/or a list of activities in a descending order to a user.

19. The system of claim 17, the location and activity recommendation model module being further to provide a display of a map based at least in part on receiving a query from the user; and in an event that query from the user comprises a location query, display on the map and at the queried location a list of recommended activities for the queried location; and in an event that the query from the user comprises an activity query, display on the map locations that are recommended for the queried activity.

\* \* \* \* \*